Nov. 21, 1950 — O. E. RASSMUSSEN — 2,530,726
CABLE STRANDING MACHINE
Filed Dec. 16, 1948 — 11 Sheets-Sheet 1
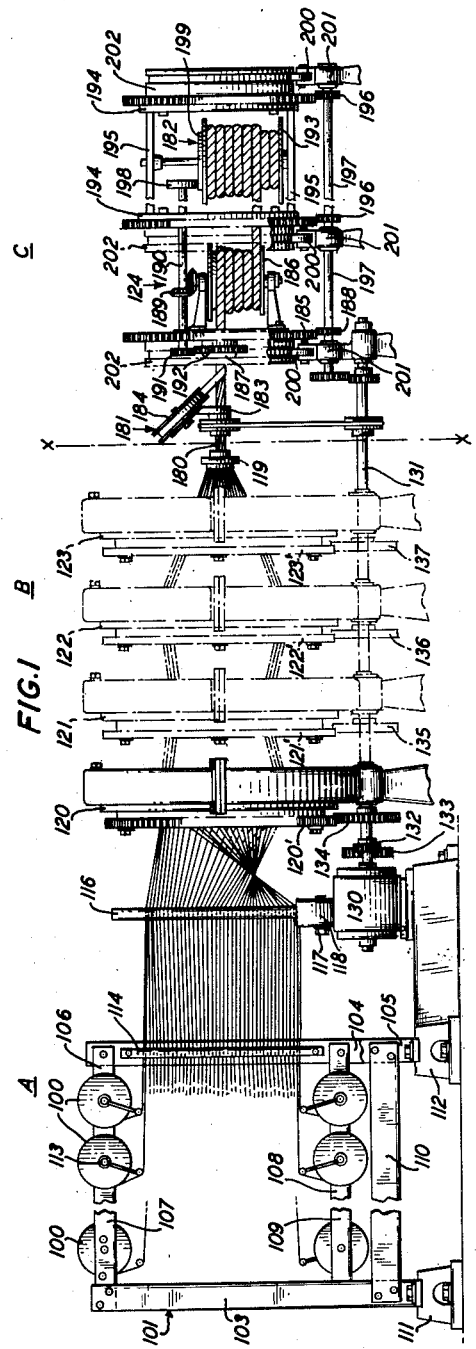
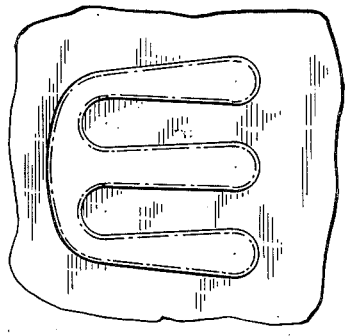
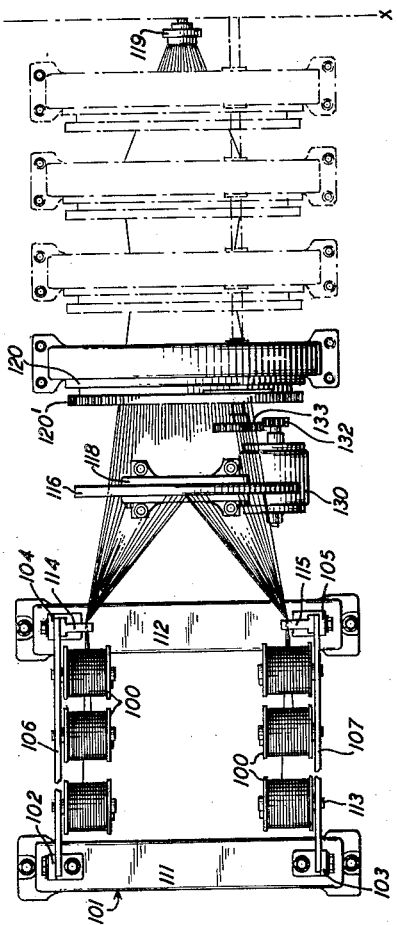
INVENTOR
O. E. RASMUSSEN
BY
ATTORNEY Nov. 21, 1950 — O. E. RASMUSSEN — 2,530,726
CABLE STRANDING MACHINE
Filed Dec. 16, 1948 — 11 Sheets-Sheet 2

INVENTOR
O. E. RASMUSSEN
BY
ATTORNEY

Nov. 21, 1950  O. E. RASMUSSEN  2,530,726
CABLE STRANDING MACHINE
Filed Dec. 16, 1948  11 Sheets-Sheet 4

INVENTOR
O. E. RASMUSSEN
BY
ATTORNEY

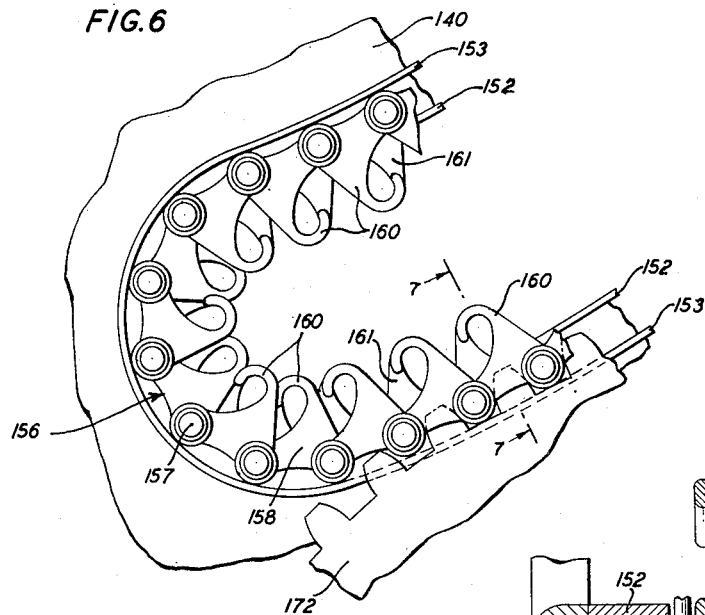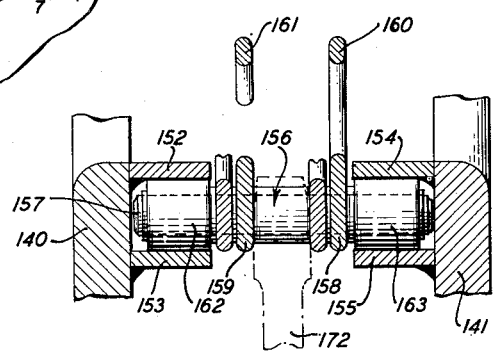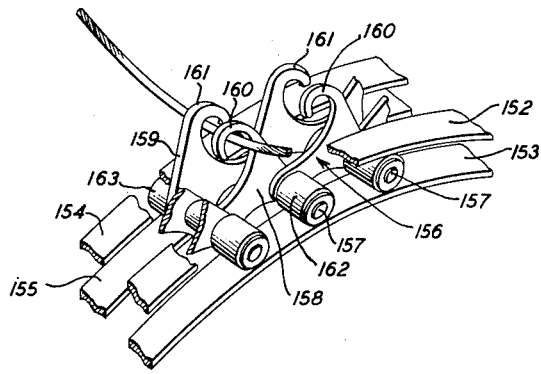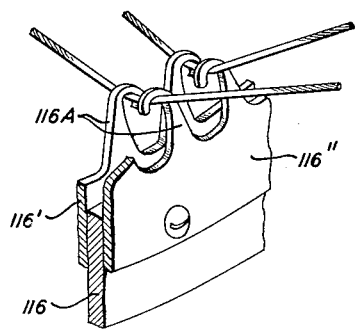

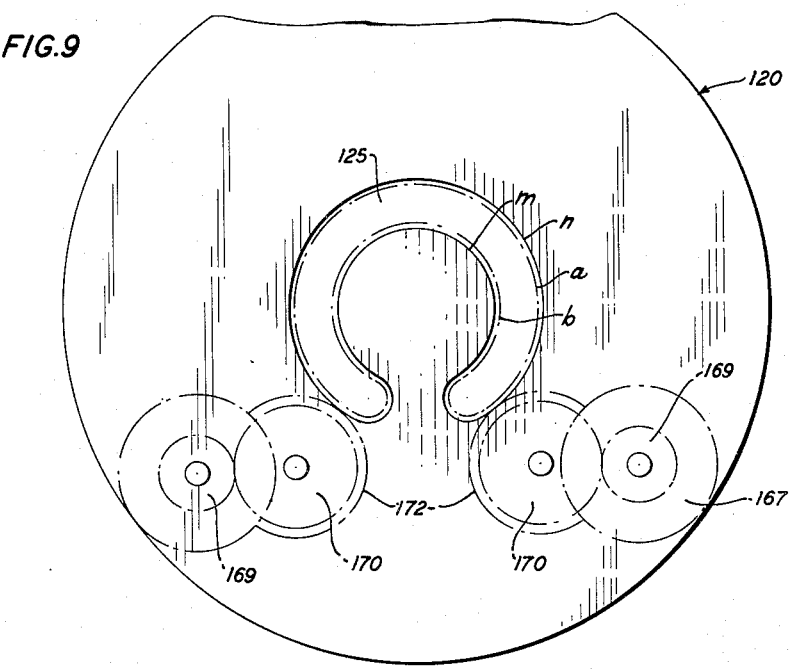
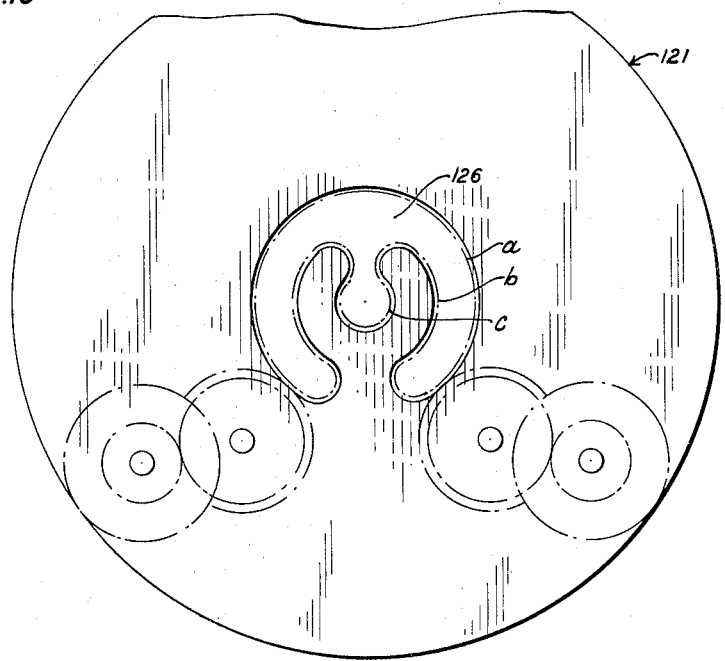

Nov. 21, 1950     O. E. RASMUSSEN     2,530,726
CABLE STRANDING MACHINE

Filed Dec. 16, 1948     11 Sheets-Sheet 7

INVENTOR
O. E. RASMUSSEN
BY
ATTORNEY

Nov. 21, 1950 — O. E. RASMUSSEN — 2,530,726
CABLE STRANDING MACHINE
Filed Dec. 16, 1948 — 11 Sheets-Sheet 8

INVENTOR
O.E. RASMUSSEN
BY
ATTORNEY

INVENTOR
O. E. RASMUSSEN
BY
ATTORNEY

Nov. 21, 1950  O. E. RASMUSSEN  2,530,726
CABLE STRANDING MACHINE
Filed Dec. 16, 1948  11 Sheets-Sheet 10
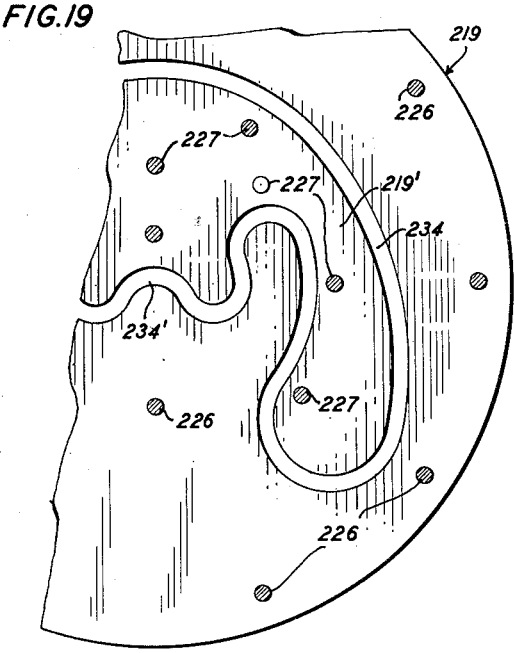
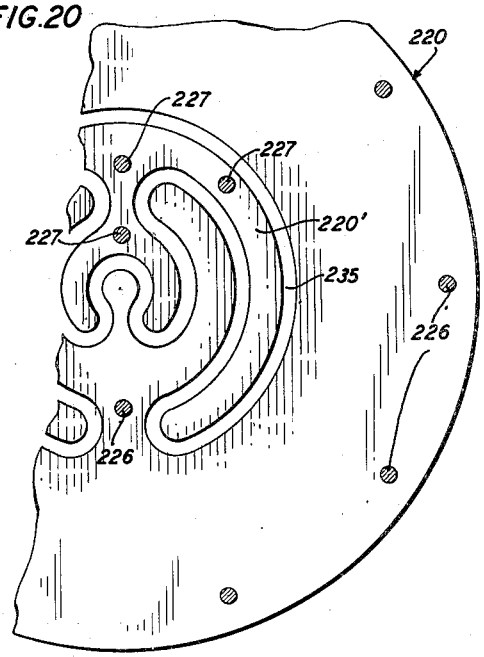
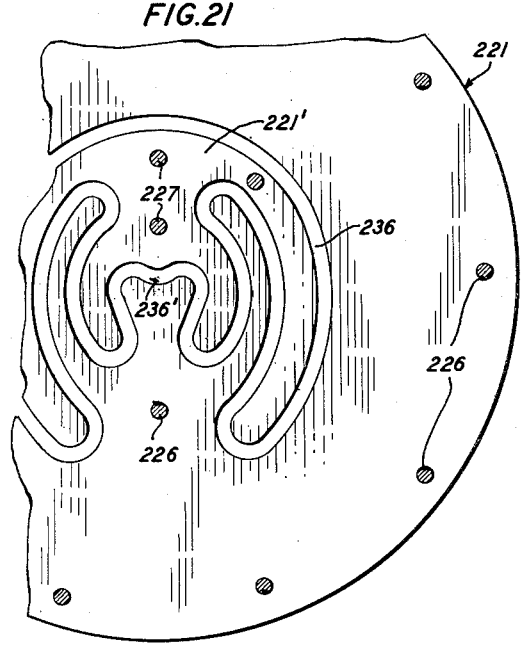
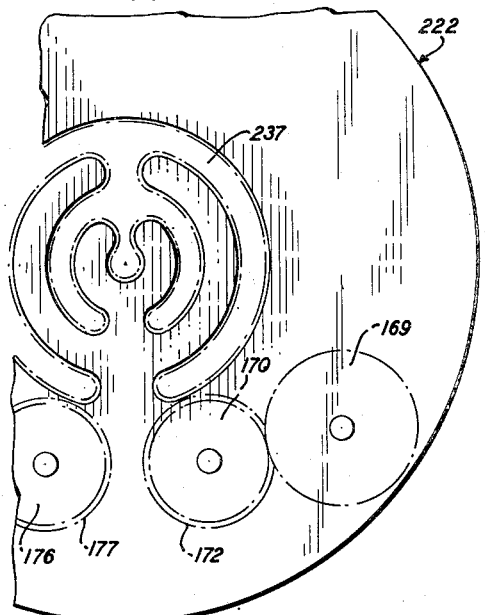
INVENTOR
O. E. RASMUSSEN
BY
ATTORNEY

INVENTOR
O. E. RASMUSSEN
BY
ATTORNEY

Patented Nov. 21, 1950  2,530,726

UNITED STATES PATENT OFFICE 2,530,726

CABLE STRANDING MACHINE

Osvald E. Rasmussen, Greenburg, N. Y., assignor to Bell Telephone Laboratories, Incorporated, New York, N. Y., a corporation of New York Application December 16, 1948, Serial No. 65,673

43 Claims. (Cl. 57—6)

This invention relates to cable stranding methods and machines and particularly to methods and machines for producing multistrand cables of the reentrant type. The reentrant type of stranded cable is characteristic in that each of the strands of the cable occupies positions at periodically varying depths in successive portions of the cable.

A cable of the reentrant type and a stranding machine for producing such a cable have been disclosed in Patent No. 2,412,196, issued to Ashbaugh and Hall on December 10, 1946.

It is an object of the invention to provide a method and apparatus in which the reentrant stranding operation into more than two or three layers will be facilitated.

It is another object of the invention to provide a reentrant-cable stranding machine which will be of simplified construction and operation.

A stranding machine of this general type comprises a strand supply with a delivery spool for each strand. The strands are pulled from the spools through a set of distributing plates to a compacting die, in which the cable is formed, and then to a capstan and a cable drum by means of which power is supplied for the lengthwise movement of the strands and the cable. By means of the set of distributing plates the strands are placed in a desired layer formation with which they enter the die. However, in accordance with the reentrant principle, the strands are moved sideways in a fixed order of succession into the various layers of the layer distribution so that each strand will periodically travel to any and all of the positions in the final layer distribution during each cycle of distributor operation in which a predetermined length of cable passes through the machine.

For the purpose of accomplishing the desired objects the invention involves a number of novel features. Thus in accordance with a feature of the invention, the set of distributors is adapted for distribution of the strands in more than two layers by the formations in three or more distributor plates which will permit the gradual distribution from a single layer to the final layer distribution in such a manner that interference between adjacent strands, while passing through the machine, will be reduced to reasonable conditions. Thus in general there may be one distributor plate for each layer in the final layer distribution, the first plate forming one layer, the second two layers, the third three layers and so on. In this manner the strands may be kept apart as they travel through the distributor set or may engage with slight distortion of their line of travel between plates only at certain crowded points. If desired, auxiliary distributor means may be provided between the main distributor plates for further separation of the traveling strands at crowded points.

In accordance with another feature of the invention, traveling and stationary elements of the stranding machine are coordinated for the reentrant stranding operations in such a manner that the delivery spools in the strand supply may remain stationary during the stranding operation of the machine, except, of course, for their individual rotation about their own axes for feeding strands. Thus, the necessity for revolving the heavy strand supply for a cable with a large number of strands is obviated, and replacement of individual spools from time to time may be accomplished without the need of stopping the whole machine.

In accordance with another feature of the invention, each of the main distributor plates produces a complete layer distribution, so that a layer may be added to a given layer distribution by adding a plate or a layer may be subtracted by removing a plate without disturbance to the remaining plates already mounted in the machine.

In one preferred embodiment of the invention the periodic transverse travel of the strands in each distributor plate and relative thereto is imparted to all the strands by mechanically driven common conveyor means, somewhat of the general nature of the chain-conveyor, disclosed in the Ashbaugh-Hall patent, referred to above. In such an embodiment and in accordance with another more specific feature of the invention, the links in the chain-conveyor are provided with guiding means for the individual strands so designed that they will permit insertion of the strands into the guiding means without the need for threading the strands therethrough. Thus the strands may be threaded through all the distributor plates when a new set-up is mounted and thereafter the individual strands may be placed in their assigned linkguides. This feature also permits changing the location of one or more strands in any plate even after the cable formation has commenced, without the need of pulling the strand out of the machine or of cutting and resplicing it.

In accordance with an alternative preferred embodiment of the invention, the periodic transverse travel of the strands in the distributor plates is effected by the combined action of the longitudinal movement of the strands under the pull from the capstan and a camming action exerted on the strands by the layer configuration in the plates, as they rotate relative to the spool supply. This feature thus obviates the need for a chain-conveyor and its driving means in each distributor plate, except perhaps in the last plate with the complete layer distribution, where it may still be advantageous to use a chain-conveyor. This feature furthermore results in a great simplification of the plates. This feature is made practically possible by the feature of the invention, referred to above, in accordance with which the machine includes one or more plates for each layer in the total layer distribution, since by the provision of a large number of camming plates the path of each strand through the whole distributor set may be made without sharp kinks and the various strands may be moved through the set without appreciable mutual interference. In fact, due to the simplicity of this type of camming plates, so many plates may be used that their layer configurations nearly define the whole path of all strands through the distribution set.

Other features of the invention will be hereinafter described and claimed.

In the following detailed description reference will be made to the accompanying drawings, in which:

Fig. 1 is a simplified side-elevational view of a stranding machine embodying features of my invention for the production of a reentrant type cable, this machine being of the type referred to above, in which a conveyor chain is used in each distributor plate;

Fig. 2 is a top plan view of a portion of the machine shown in Fig. 1;

Fig. 6 is a fragmentary detail view showng a portion of a strand conveyor chain in a layer-distributor track;

Fig. 7 is a sectional view taken on line 7—7 of Fig. 6;

Fig. 8 is a fragmentary perspective view showing a portion of said conveyor chain and adjacent track;

Fig. 8A is a fragmentary detail view showing a modified form of circular distributing plate;

Figure 13:
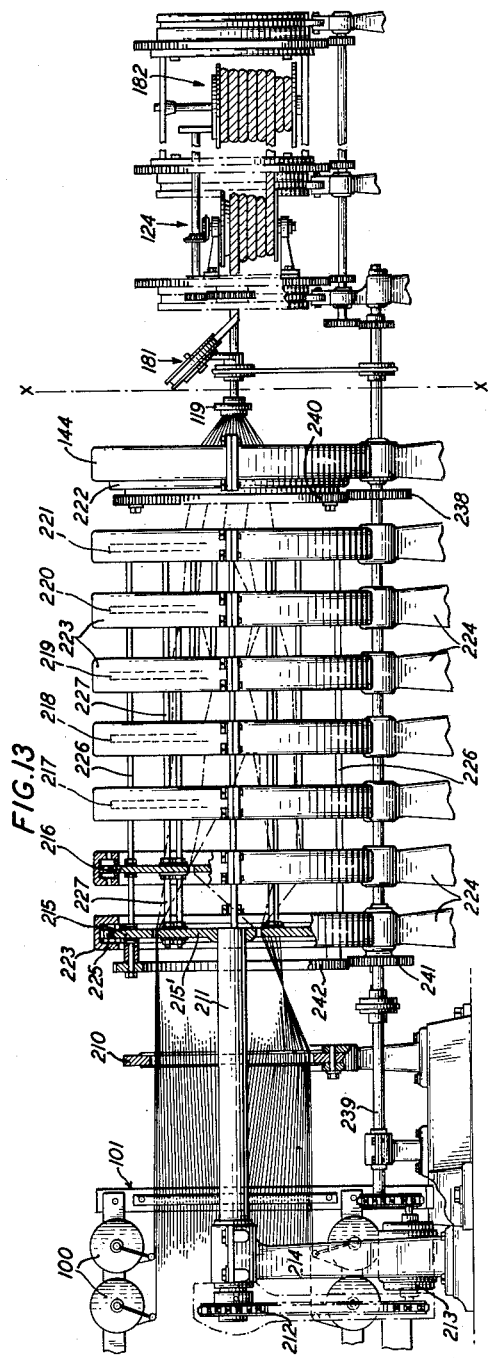
Figure 14:
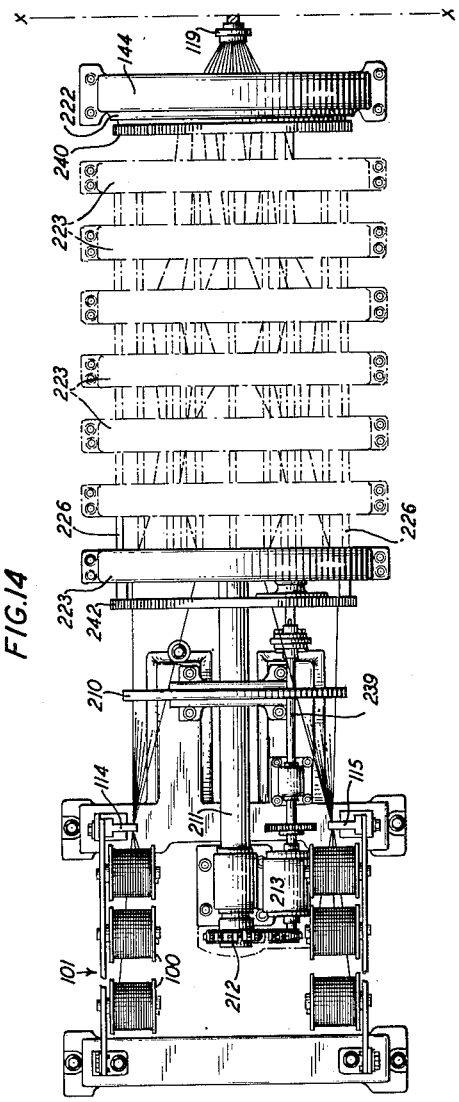
Figure 15:
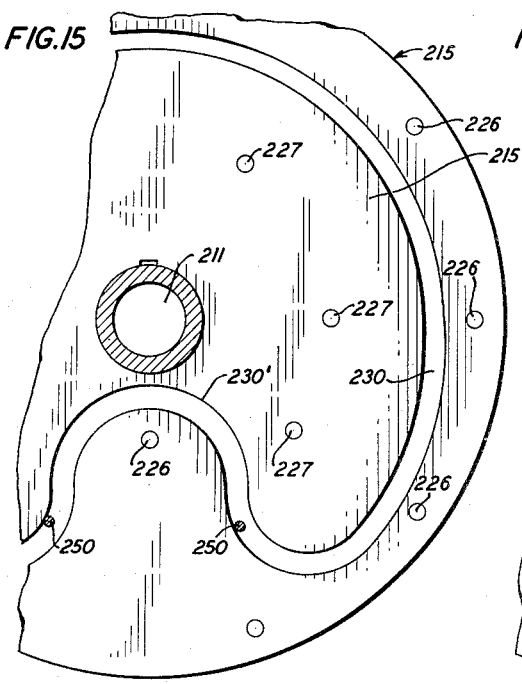
Figure 16:
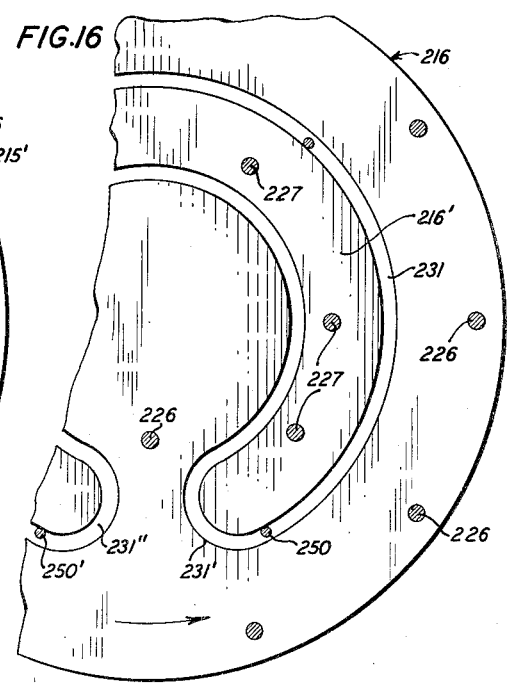
Figure 17:
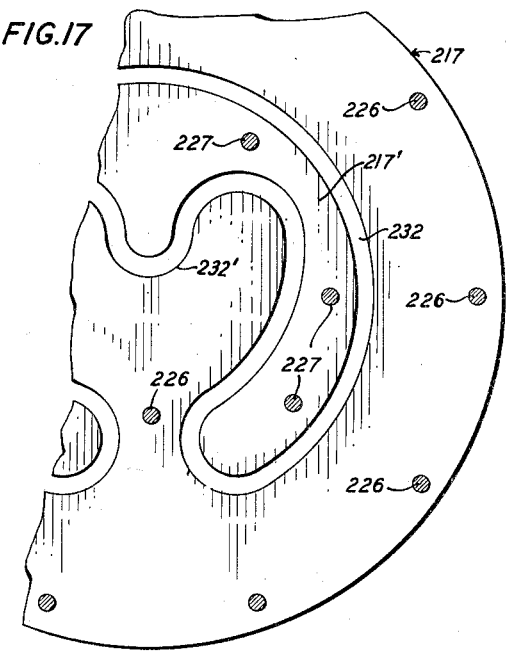
Figure 18:
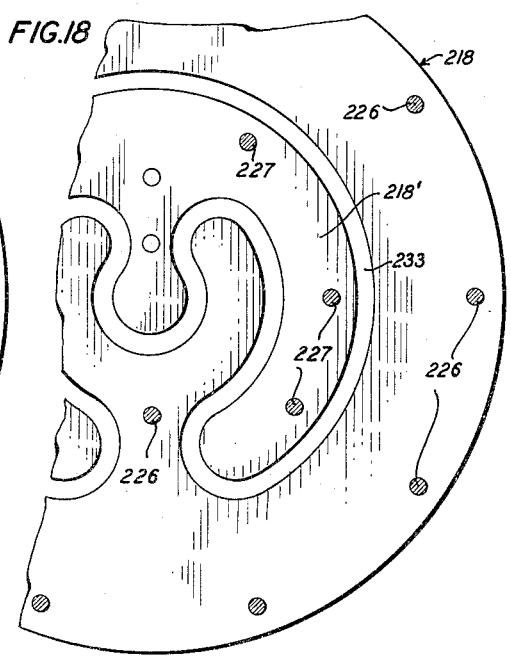
Figure 26:
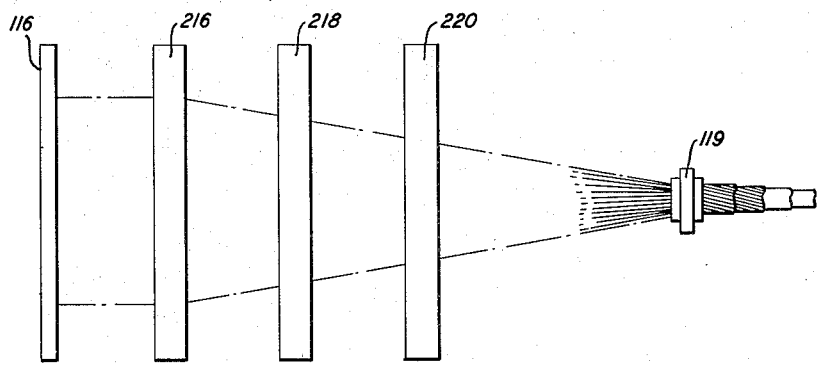
Figure 27:
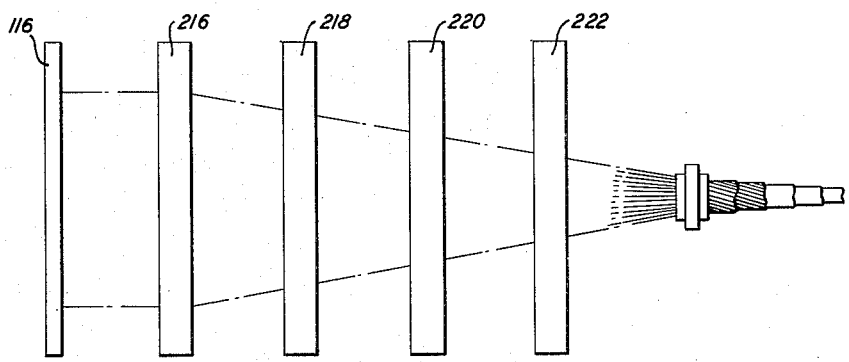
Figure 23:
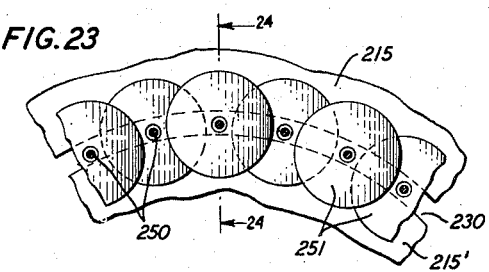
Figure 24:
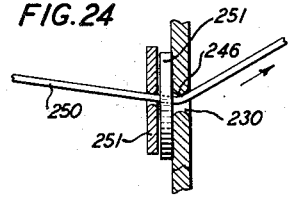
Figure 25:
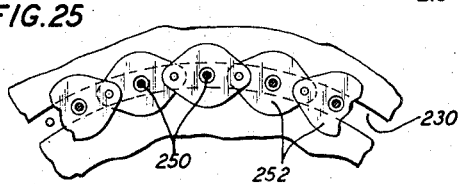
Figure 24A:
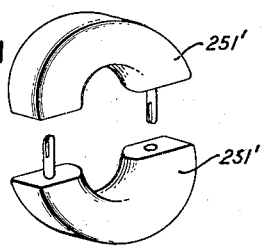

Figs. 9–12, inclusive, are simplified elevational views of successive layer-distributor plates, respectively, in the machine of Figs. 1 and 2;

Fig. 13 is a simplified side elevational view of a stranding machine embodying a modified form of the invention, this machine being generally of the alternative type, referred to above, in which most of the layer distributing plates operate without a strand conveyor chain;

Fig. 14 is a top plan view of a portion of the machine shown in Fig. 13;

Figs. 15–22, inclusive, are simplified elevational views of successive layer-distributor plates, respectively, in the embodiment of Figs. 13 and 14;

Fig. 23 is a fragmentary elevational view showing a series of guides for maintaining successive strands in properly separated relation during their passage through trackways of layer distributor plates in the Figs. 13 and 14 arrangement;

Fig. 24 is a sectional view taken on line 24—24 of Fig. 23;

Fig. 24A is a detail view in perspective showing a modified form of spacer disk which may be employed in connection with the layer distributor plates of the Figs. 13 and 14 arrangement;

Fig. 25 is a fragmentary view of an alternative form of strand separating guides;

Fig. 26 is a diagrammatic view showing one circular distributor plate and three layer distributor plates, together with the usual compacting die for assembling the converging strands from the distributor plate;

Fig. 27 is a view similar to Fig. 26 but showing an additional layer distributing plate interposed between the circular distributing plate and the compacting die for the formation of an additional layer in the stranding pattern;

Fig. 28 is a fragmentary elevational view, showing an alternative form of distributor-plate slot or track.

In the drawing in order to avoid unnecessary duplication portions of the complete machine have been omitted in Figs. 2 and 14. The lines $x$—$x$ in Figs. 1 and 2 correspond as do the lines $x$—$x$ in Figs. 13 and 14. Thus these lines provide a reference whereby the portions of the machine omitted in Figs. 2 and 14 may be determined readily.

The strands employed by my invention in the formation of the cable may be of conventional form. For instance, each strand may contain a twisted pair of insulated conductors (such as shown in Fig. 1 of the aforementioned Ashbaugh-Hall patent), or each strand may be composed of four insulated conductors (as in Ashbaugh-Hall's Fig. 2) twisted to form what is known as a star-quad. Other types of strands and other types of twisting may be used within the scope of the invention.

Referring now particularly to Figs. 1 and 2, the stranding machine there illustrated comprises a strand supply A, strand distributing equipment B, and a cable storing apparatus C.

The strand supply may be arranged in any convenient manner, but in the present embodiment comprises a plurality of spools 100 mounted in a suitable stationary framework 101. The framework may be formed of vertical bars 102, 103, 104 and 105, together with intervening cross bars such as are illustrated at 106, 107, 108, 109 and 110. The vertical bars are bolted to suitable stationary base supports 111, 112.

The individual spools 100 contain a supply of strand for the cable and each is mounted or pivoted for individual rotation on a spindle 113 and has a brake arrangement for tensioning of the strand, as is well known in the art. The strand from the spool may be led through suitable eyelets arranged to equalize the speed of feeding of the strand, as is well-known in the art. Details of these spool mountings are not shown in the drawing, since they do not form a part of the invention. For information on such details reference may be had to the United States Patents 1,579,769, issued to H. F. Jones on April 6, 1926, and 1,813,197 issued to L. O. Reichelt on July 7, 1931.

The framework 101 contains a spool 100 for each strand.

Attached to the vertical posts 104, 105 are guides 114, 115 suitably apertured to permit the passage of the strands from the spools 100. For instance, if a cable is to be formed from eighty strands, there will be eighty spools suitably distributed in the framework 101. There may be, for example, forty spools mounted between the vertical posts 102 and 104 and forty other spools supported between the posts 103 and 105. The strands from the spools between posts 102 and 104 pass through the apertured guide 114, as shown in Figs. 1 and 2. Similarly, the strands from the spools between posts 103 and 105 pass through the apertured guide 115.

From the guides 114, 115 the strands are passed through a stationary distributing plate 116, which, as shown, may be rigidly secured, as by bolts 117, to a suitable stationary support 118. The distributor plate 116 may be a simple annular ring structure having guide holes, one for each strand, arranged in a circle, as in the distributor plate 210 in the aforementioned Ashbaugh and Hall patent. The plate 116 should, of course, have a sufficient number of guide holes to accommodate the total number of strands for the largest cable that may be produced by the machine.

However, for some of the more important purposes of the invention, the distributor plate 116 is formed as a ring provided with two series of guide hooks instead of with guide holes. Thus, as shown in Fig. 8A, the stationary distributor ring 116 has mounted on opposite sides thereof two other rings 116' and 116", each having a series of hooks 116A along its inner edge and extending beyond its inner perimeter. The rings 116', 116", when mounted are turned so that their hook portions face in opposite directions. In this manner a strand may be laid in a pair of hooks, without threading, and will be locked in position during stranding operations by the opposed overlapping hook portions.

It will be apparent that if desired, each of the guides 114, 115 may be provided with sets of opposed hooks similar to the hooks 116A above described, for receiving the strands without the necessity of threading them through individual openings in the guides.

Between the circular distributing plate 116 and the conventional compacting die 119 I interpose a series of layer distributing plates, which receive the strands from said circular distributing plate and distribute said strands in progressively increasing numbers of layers until the desired final layer formation is attained. The strands are drawn from the spools 100, through the distributor plates and compacting die 119, by a rotatable capstan 124, which capstan may be of conventional construction.

In the embodiment illustrated in Figs. 1 and 2 there are shown four rotating layer distributing plates, designated 120, 121, 122 and 123, respectively, positioned between the plate 116 and the compacting die 119, and rotatable about a common axis. As shown in Figs. 9–12, each of said plates 120—123 has an opening or track for distribution of the strands in concentric layer formation, the opening in each plate providing for one more layer than the preceding plate.

Thus, the plate 120 (Fig. 9) has an opening 125 providing surfaces m and n for the distribution of the strands in corresponding layers a and b. It has been noted that in the plate 116 the strands are distributed in a single circular layer. In plate 120, which receives the strands from plate 116, the single circular distribution is altered to a double arcuate distribution, i. e., along two concentric arcuate layers a and b. In other words, the circular strand layer obtained from plate 116 is folded within itself to form a double layer in plate 120.

In plate 121 (Fig. 10) which receives the double layer of strands from plate 120, the opening 126 provides for three concentric layers, a, b and c; the inner layer of the double strand layer obtained from plate 120 being folded within itself in plate 121 to form a third layer c.

In plate 122 (Fig. 11) the opening 127 provides for four concentric layers, a, b, c and d; whereby the innermost layer of the strands passing from plate 121 is folded within itself in plate 122 to provide an additional layer d.

Finally, the opening 128 in plate 123 (Fig. 12) provides for five concentric strand layers, a, b, c, d and e; so that the innermost layer of the strands passing from plate 122 is folded within itself in plate 123 to produce an additional layer e.

The distributor plates 120—123 may be continuously rotated during the stranding operation. For that purpose a motor 130 (Fig. 1) may be provided, said motor driving a shaft 131 through a pinion 132 and gear wheel 133. Gear wheels 134, 135, 136 and 137 secured to said shaft, mesh with gears 120', 121', 122' and 123' fastened to the respective distributors 120, 121, 122 and 123.

The distributor plates 120—123 may be of identical construction except for the shape of the layer-distributing openings or tracks above referred to and for the ratio of internal gearing as will be described hereinafter. As exemplifying the construction of said plates, a description of one of them, namely the plate 123, will suffice.

Figure 3:
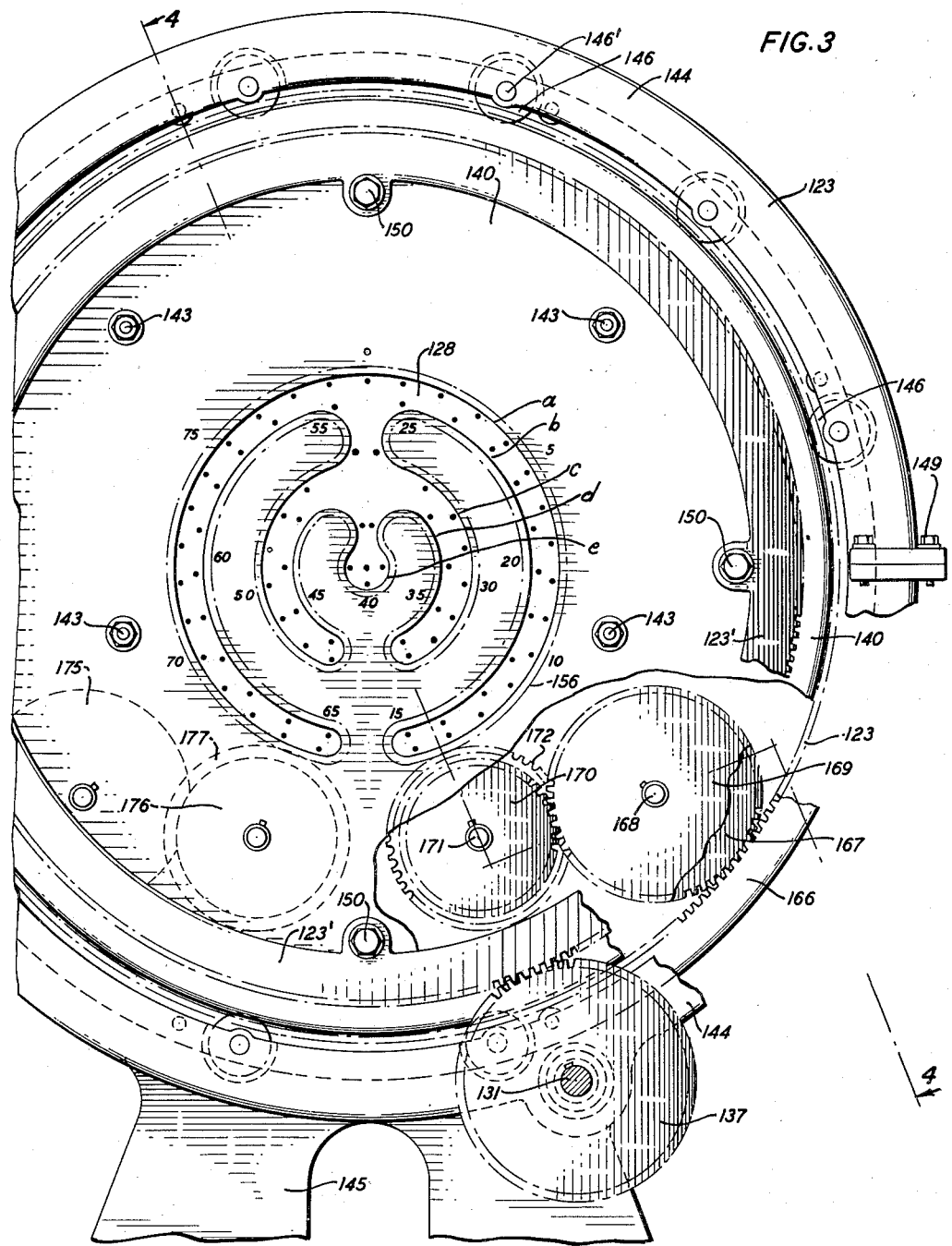
Fig. 3 is a side-elevational view, with parts broken away, showing one of the layer distributing plates and associated equipment employed in the machine of Figs. 1 and 2.
Figure 4:
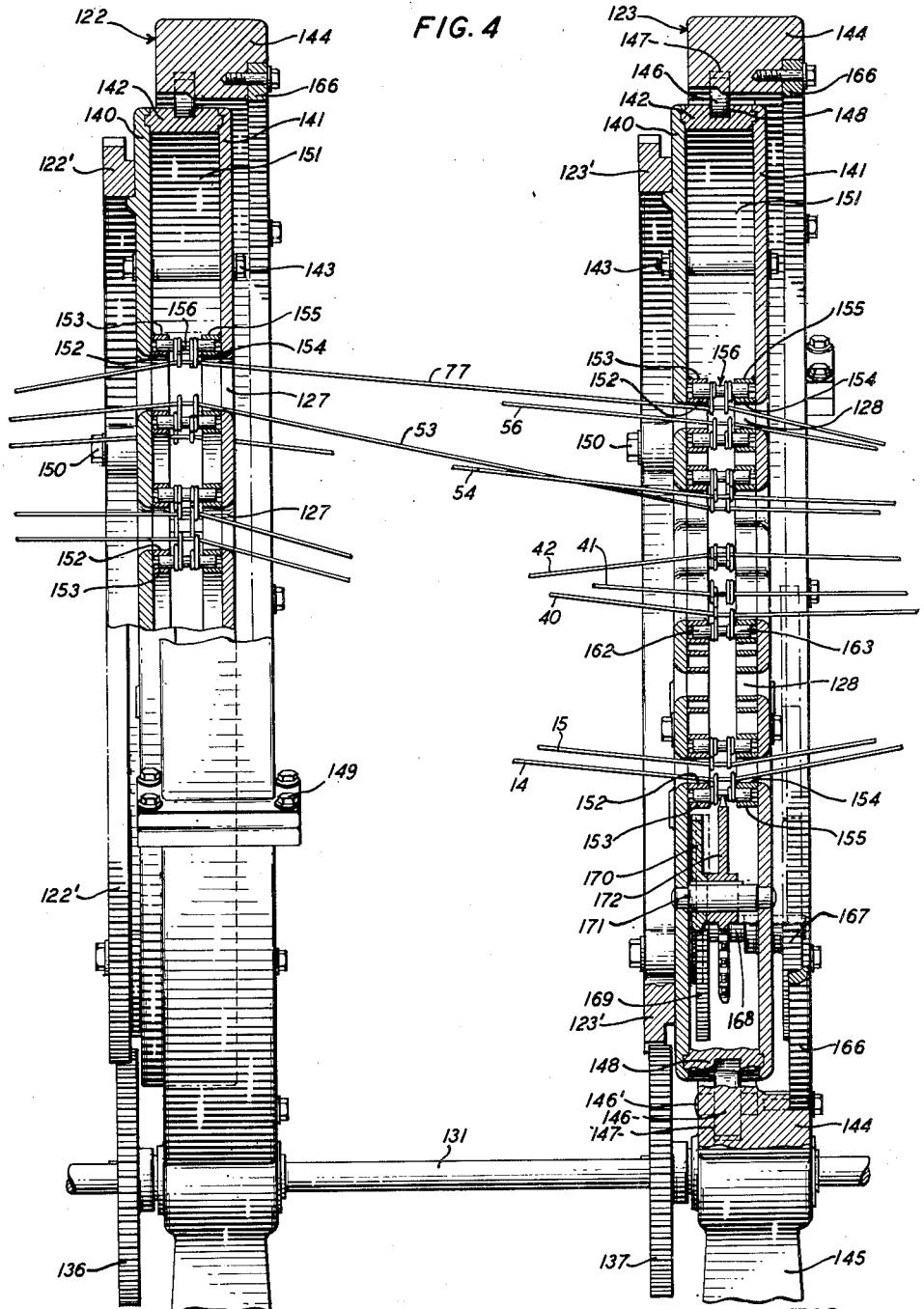
Fig. 4 is a view partly in elevation and partly in vertical section, showing two successive layer-distributing plates and associated drive mechanism. In this figure, the right-hand plate is the plate of Fig. 3 as it appears when viewed in section along the line 4—4 of Fig. 3.

Referring to Figs. 3 and 4, it will be noted that the distributor plate 123 comprises front and rear plates or walls 140 and 141 spaced apart by an annular member 142, said walls and spacing member being firmly fastened together as a unit by bolts 143 suitably spaced around said walls. The distributor plate assembly 123, comprising said walls 140, 141 and spacer 142, is rotatably mounted in a stationary annular bearing member 144 mounted on a pedestal 145. Antifriction means, such as rollers 146, may be interposed between said distributor plate 123 and the interior of said bearing member 144. Conveniently, the rollers may rotate in grooves 147, 148 in said bearing member 144 and spacer 142, respectively; said rollers having axle projections 146' journaled in said bearing member 144. Said member 144 may, as shown, be formed in semi-circular sections suitably bolted together as at 149. The gear member 123' is fastened to the front wall 140 by suitably spaced bolts 150.

The walls 140 and 141 are cut away or otherwise formed to provide the previously mentioned opening 128 (Figs. 3, 4 and 12) through which the strands pass from the preceding distributor. The spacing of said walls by the member 142 provides a hollow interior 151. Within said interior, and suitably secured to the wall 140, as by welding or otherwise, are inner and outer track members 152, 153 respectively, as shown in Figs. 4 and 7; while similar track members 154, 155 are secured to the opposite wall 141. All of said track members follow the contour or configuration of the opening 128 and provide a continuous trackway for an endless conveyor 156.

Said conveyor 156 may comprise a series of spindles 157 connected together by a plurality of series of links 158, 159 (Figs. 6, 7 and 8). The links 158 have hook portions 160 facing in opposite direction to hook portions 161 on the links 159. Each cable strand is passed under hook 160 of one of the links 158 and also under the oppositely facing hook 161 of the adjacent link 159, as illustrated in Figs. 4 and 8. The hooks 160, 161 of the conveyor 156 thus provide for spacing or distributing the strands throughout the multilayer opening 128.

This arrangement resembles the arrangement of opposed hooks used in the modified form of stationary plate 116 (shown in Fig. 8A and above described) in that a strand may be laid in under a pair of hooks without threading and yet will be locked in position during the operation of the machine. This provision facilitates a redistribution of strands here and there along the track before starting, whenever desired, even after all strands have been passed through the machine.

The number of hooked links on each chain is sufficient for the maximum capacity of the machine.

Journaled on opposite ends of each spindle 157 are rollers 162, 163; the rollers 162 engaging the trackway formed by the members 152, 153 while rollers 163 engage the trackway formed by the members 154, 155 (Fig. 7).

In Figs. 3 and 4 there is illustrated a distribution of cable strands in the distributor plate 123, suitable for an eighty-strand cable. In Fig. 3 the strands are indicated by dots around the conveyor trackway in the opening 128. Commencing with the strand position designated o in Fig. 3, every fifth strand is indicated by the numerals 5, 10, etc., there being eighty strands in the whole trackway. Various strands passing from distributor 122 to distributor 123 are also numbered in Fig. 4. Incidentally, it may be noted that in Fig. 4 the parts of the distributor 122 corresponding to parts in distributor 123 bear the same reference numerals. As previously noted, each distributor 120, 121, 122 and 123 may be of the same construction aside from the configuration of its strand opening or trackway.

Figure 5:
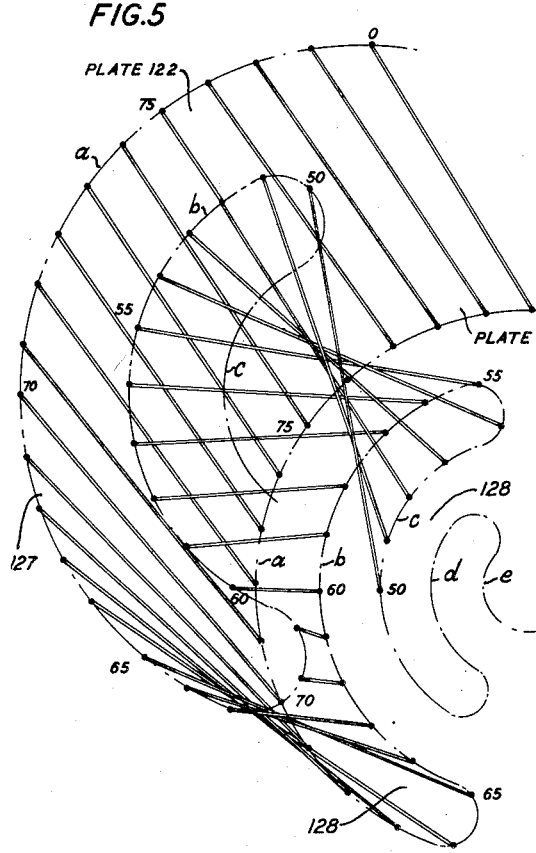
Fig. 5 is a diagrammatic view illustrating the positions taken by different strands passing through portions of the tracks of the four-layer and five-layer distributor plates.
Figure 5A:
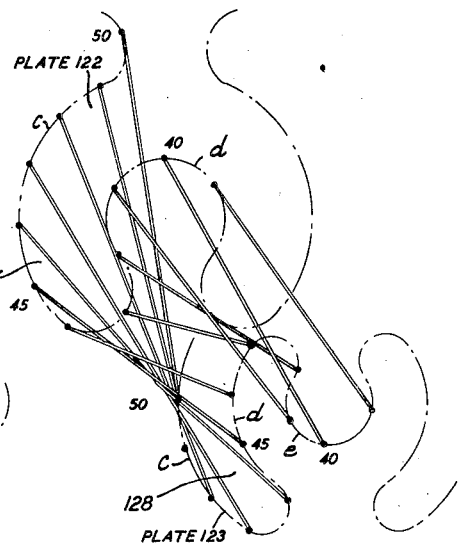
Fig. 5A is a similar view showing strand positions in further track portions of said plates.

The momentary distribution of the strands passing between distributor plates 122 and 123, which have the most complicated tracks is further illustrated in Figs. 5 and 5A. In Fig. 5, the strand designated o and the first thirty strands to the left thereof (terminating with strand 50) are shown passing through the track portions $a$ and $b$ of opening 127 in distributor 122. Twenty-six of these strands extend through track portions $a$ and $b$ of the opening 128 in distributor 123, and the other five extend through portion $c$ of said opening 128. In Fig. 5A, strands 50—40 are shown extending through track portions $c$ and $d$ of opening 127 and through track portions $c$, $d$ and $e$ of opening 128. The strands at the right of strand o in Fig. 3 are arranged similarly to those above discussed, one of said strands being shown in Fig. 5A at the right of the strand designated 40.

It will thus be seen that the strands passing from plate 122 to plate 123 are converted from a four-layer arrangement to five layers. Similarly, the strands passing from plate 116 to plate 120 (Fig. 9) are changed from one to two layers; those from plate 120 to plate 121 (Fig. 10) are changed to three layers and those from plate 121 to plate 122 (Fig. 11) are converted from three to four layers. The final layer distribution of the eighty strands in the example illustrated is as shown in Figs. 3 and 12.

As previously observed, the strands are continuously drawn through the various distributor plates 116, 120—123, and compacting die 119 by the capstan 134. Simultaneously with this longitudinal travel, the strands passing through the rotating distributors 120—123 move laterally or transversely of said distributors, so that each strand travels transversely through the successive strand layers in each distributor and by the end of its transverse travel in the final distributing plate each strand has passed through all of the positions to be simultaneously occupied by all of the strands in the finished cable. In other words, each strand during the travel of a predetermined length of cable through the machine, passes through all of the aforementioned positions so that in each predetermined length of the finished cable each strand occupies successive positions at all possible depths from the surface to the center.

It will be apparent that if desired, the strand spools 109 may be mounted in a rotatable cradle with which the circular distributing plate 116 may also rotate like the spools 161, cradle 110 and circular distributing plate 218 in the previously mentioned Ashbaugh and Hall Patent No. 2,412,196. In such event, the layer distributing plates 120—123 which I provide would be stationary and the conveyors 156 therein would be driven continuously in unison directly by the motor 130 or other suitable motive means.

Through the provision of the series of layer distributing plates 120—123, with their provisions for distributing the strands in progressively increasing numbers of layers until the desired final layer formation is obtained, I am able to avoid undue crowding of the strands such as would be particularly likely to be encountered in the winding of reentrant cables of more than three layers by a machine using only a single rotary distributor plate.

The reduced crowding and interference between the strands is secured mainly by the two features of the distributing set, in accordance with one of which only one layer at a time is folded inside itself so that each new redistribution may be finished before the next layer is folded in, and in accordance with the other of which the various bays or horns in the layer pattern of the strand openings do not extend beyond a semi-circle so that a strand need not penetrate too deeply into the mass of strands and need not move along too deep a curve as it travels through the various parts of the pattern.

Through my provision of distributor plates, such as shown at 120—123, for the progressive redistribution of the strands from the first or circular stage to the final layer stage, as many as five layers of reentrant cable strands may be wound without crowding, as will particularly be apparent from Figs. 5 and 5A. For still more layers the number of distributor plates may of course be correspondingly increased, the final plate of the series embodying the desired final layer distribution.

As above pointed out, the desired transverse motion of the strands in the distributor plates 120—123 may be obtained by driving the conveyors 156 in said plates while said plates are stationary, and the spool cradle and circular distributing plate 116 are rotating. However, by rotating the distributor plates 120—123, as shown in Figs. 1-4, I am able to dispense with the necessity of rotating the heavy spool cradle, which is of distinct advantage and empty spools may be replaced without the need of stopping the machine. Rotation of the circular distributing plate 116 is also avoided with resultant advantage, especially where numerous strands are involved.

During the rotation of the distributor plates 120—123, the respective conveyor chains 156 are driven in the strand openings in said plates to move the strands transversely in predetermined order with respect to said plates, so that each of said strands is caused to occupy substantially all positions in succession in each layer of each of the strand distributions. For this purpose, I provide means which may take the following form (referring particularly to Figs. 3 and 4).

Fastened to the stationary bearing member 144 is an annular internal gear member 166 which is engaged by a gear wheel 167 fastened on a shaft 168 suitably journaled in the walls 140, 141 of the distributor plate 123. Also secured to said shaft 168 in the space between said walls is a gear wheel 169 which meshes with another gear 170 secured to a shaft 171 also journaled in said walls 140, 141. A sprocket wheel 172 is fastened to said shaft 171 and engages the spindles of the conveyor chain 156 to drive the latter as shown in Figs. 4, 6 and 7.

With this construction it will readily be seen that as the distributor plate rotates, carrying with it the conveyor chain 156, sprocket wheel 172 and gears 167, 169, 170, said gears and sprocket wheel are continuously rotated through the engagement of gear 167 with the stationary internal gear 166. Thereby the conveyor chain 156 is continuously moved along its trackways in the opening 128 as long as the distributor plate is rotating. With the gearing so chosen that the conveyor chain 156 is driven through one complete turn in one revolution of the distributor 123 it will be seen that the strands passing through said conveyor will likewise be carried completely around the tracks in said opening during said distributor revolution. For instance, the strand in the position designated o in Fig. 3 will pass completely around the opening 128 and back to said o position in one revolution of the distributor 123, the strand in the position designated 5 will pass completely around said opening and back to said position 5, and so on. Thus at the end of each revolution of the distributor plate, the strands passing therethrough are restored to the same positions which they occupied with respect to said plate at the beginning of the revolution, without imparting an ultimate twist to the body of strands. While the strands are being drawn longitudinally through said conveyor, they are also traveling with the conveyor in the opening of said plate so as to be stranded into the desired layer distribution.

To assist in imparting a desirable smooth and continuous motion to the conveyor 156, and to insure that the necessary power is transmitted to the chain without undue strain on the teeth or links, there may be provided in the distributor plate 123 additional sets of planetary gearing similar to that above described. Such an additional planetary gear set may be a duplicate of that previously described and may comprise a pair of gears 175 similar to the gears 167 and 169 secured to a common shaft, one meshing with the internal gear 166 and the other meshing with a gear 176 and thereby driving sprocket wheel 177 which engages another portion of the conveyor.

Figure 11:
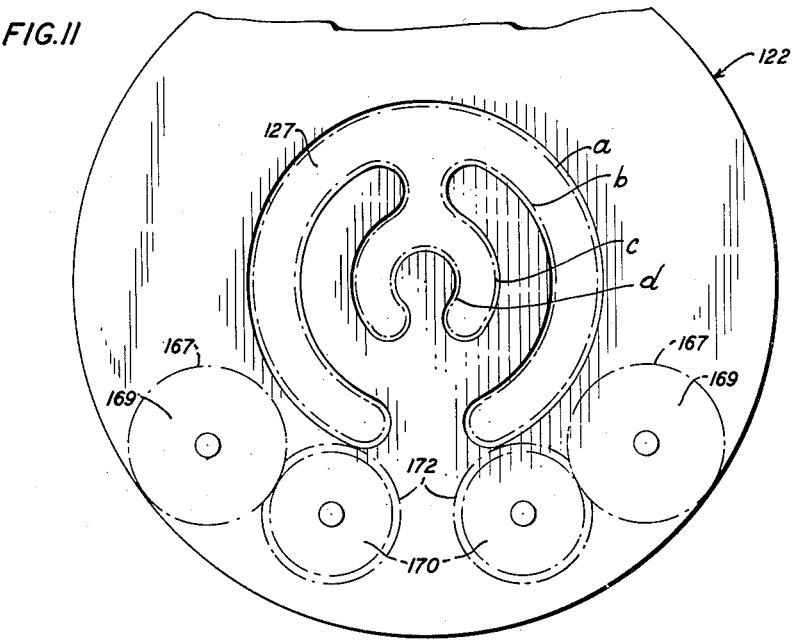
Figure 12:
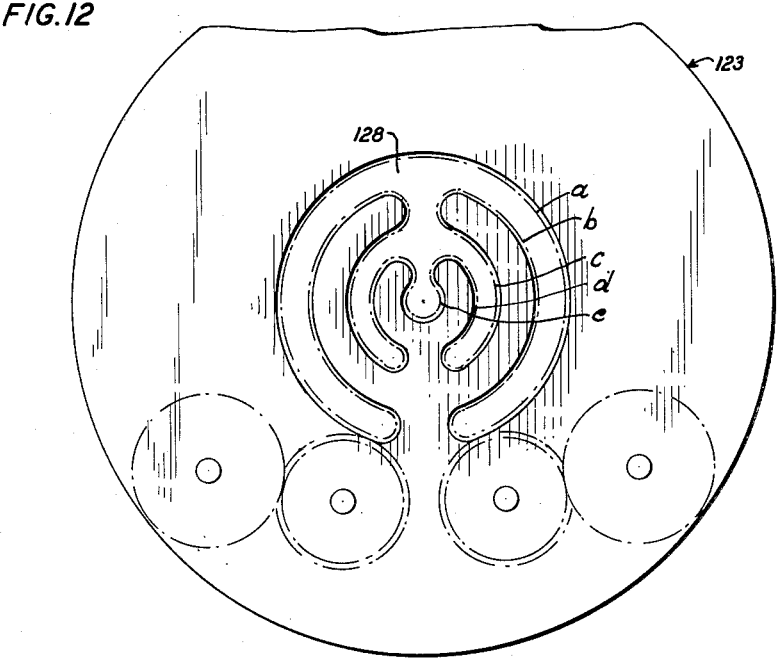

Planetary gear sets, such as those above described, are also provided for driving the conveyor chain of each of the other distributor plates, as indicated in Figs. 9, 10 and 11, so that each of said conveyor chains is driven through one complete turn with respect to its distributor plate in one revolution of said plate.

In summary, as the distributor plates are rotated in unison while the cable strands are drawn through the conveyors in said plates, the conveyors are driven through one complete turn with respect to their plates in each plate rotation. The circular strand layer passing from the stationary circular distributing plate 116 to the first layer-distributing plate 120 is folded within itself to form a double layer by the conveyor traveling in the opening 125 of said plate 120. The double layer of strands received from plate 120 by plate 121 is formed into three layers by the conveyor traveling in the opening 126, during a revolution of said plate 121. The triple layer of strands passing from plate 121 to plate 122 is formed into four layers by the conveyor in the opening 127, during a revolution of plate 122. Finally, the four layers received by plate 123 from plate 122 are formed into five layers by the conveyor traveling in opening 128, during one revolution of said plate 123. The strands are thus progressively formed into the desired five layer distribution during their travel through the rotating distributor plates 120—123, and each strand is caused to pass through all positions in succession in each layer of the strand distributions. At the end of each revolution of each plate, the strands passing through the conveyor therein are restored by said conveyor to the same relative positions that they occupied at the beginning of the revolution, without an ultimate twist to the body of strands.

In the following, some details are presented which will serve as a concrete example of the manner in which the features of the invention may be used in practice. Variations in these details are of course possible without a departure from the scope of the invention.

A machine such as is described above and illustrated in Figs. 1 to 12, is equipped with as many distributor plates as there are layers in a cable core to be stranded thereby. The total number of strands in a cable core with a given number of layers varies to an appreciable extent, depending on the nature of the strands and the desired density of the finished core.

It may be assumed that the capacity of the machine is 100–120 strands and 7 or 8 distributing plates.

The stationary plate 116 has one hundred sixty guide holes or hooks.

The number of links in the conveyor chains in the distributor plates 120 to 123 and their approximate distribution along the strand opening in the different layers are as follows:

|  | Number of Links in Layers | | | | | Total |
| --- | --- | --- | --- | --- | --- | --- |
|  | a | b | c | d | e |  |
| plate 120 | 100 | 60 |  |  |  | 160 |
| plate 121 | 90 | 50 | 20 |  |  | 160 |
| plate 122 | 140 | 100 | 55 | 25 |  | 320 |
| plate 123 | 115 | 90 | 65 | 35 | 15 | 320 |

Additional plates for additional layers may have chains of four hundred eighty or six hundred forty links, it being advisable to enlarge the pattern of the strand opening as the number of layers increases in order to maintain reasonably large curvatures in the sharper bends of the chain track. The links are the same size in all chains.

In the following the gearing is given in terms of links, corresponding to those in the chains, rather than in terms of teeth, it being a simple matter to convert these figures into number of teeth of convenient size.

Thus the main drive 166 in each rotating plate has a number of teeth equivalent to two hundred eighty links.

In plates 122 and 123, gear wheels 167 and 169 are alike with a number of teeth equivalent to sixty links; gear wheel 170 has a number of teeth equivalent to forty-nine links and sprocket wheel 172 has a number of teeth equivalent to fifty-six links.

In plates 120 and 121 gear wheel 167 has a number of teeth equivalent to sixty links; wheel 169 has a number of teeth equivalent to thirty links, wheel 170 has a number of teeth equivalent to forty-nine links and sprocket wheel 172 has a number of teeth equivalent to fifty-six links.

With this gearing the chains will travel once through the different layer configurations in the time the plates make one revolution.

Figure 5B:
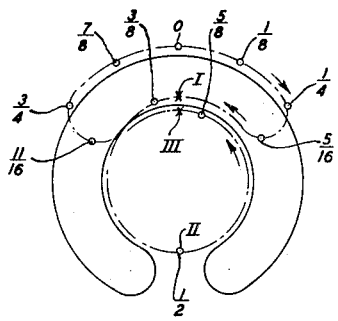
Fig. 5B is a diagrammatic view showing the travel in space of a link of a conveyor chain in the two-layer distributor plate, during one revolution of that plate.

For the sake of clarification there is shown in Fig. 5B a diagram of the actual travel in space of a single link 158 during two revolutions of the two layer plate 120. In this diagram the fractions $\frac{1}{8}$, $\frac{1}{4}$, $\frac{5}{16}$, etc., indicate the positions this link will be in after $\frac{1}{8}$, $\frac{1}{4}$, $\frac{5}{16}$, etc., of a revolution of the plate. It will be apparent that the link itself first undergoes a clockwise half turn in traveling from position 0 to position I, thereafter undoes this half turn in traveling from position I to position II, then makes an anti-clockwise half turn between positions II and III and undoes that in traveling from position III back to position 0. The same operations are performed by the adjacent links which thus go through similar opposite half turns individually and together with their adjacent links, but after one revolution return to the starting point without having turned about one another, and therefore without having imparted a final twist to the strands passing through the said links.

Figure 5C:
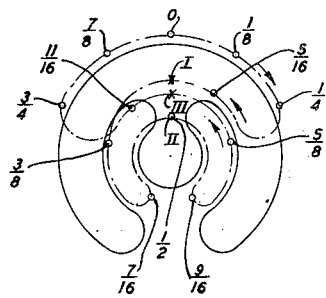
Fig. 5C is a similar diagrammatic view with respect to a link in the three-layer distributor plate.

A similar diagram of the travel of a link in the three-layer plate 121 during one revolution of the plate is shown in Fig. 5C. The doing and undoing of successive half turns of the link will readily be apparent also for this plate. Other similar diagrams may be drawn for the more complicated plates 122 and 123.

With the five distributor plates, shown in Figs. 1 and 2, different five layer cables may be stranded by the machine.

For a cable with an average of four strands in the center, every fourth link would be used in layer $e$ of plate 123. Similarly, using every fourth link in all layers of plates 122 and 123 and every second link in all layers of plates 116, 120 and 121, the strands would be distributed approximately as follows:

| | Distribution of Strands in Plates | | | | |
|---|---|---|---|---|---|
| | 116 | 120 | 121 | 122 | 123 |
| Layer e | | | | | 4 |
| Layer d | | | | 6 | 9 |
| Layer c | | | 10 | 14 | 16 |
| Layer b | | 30 | 25 | 25 | 22 |
| Layer a | 80 | 50 | 45 | 35 | 29 |
| Total | 80 | 80 | 80 | 80 | 80 |

For a five-layer cable with three strands in the center every fifth link would be used in layer $e$ of plate 123. Similarly, using every fifth link in all layers of plates 122 and 123 and every 2½ link, average, in plates 116, 120 and 121 the complete distribution would be as follows:

| | Distribution of Strands in Plates | | | | |
|---|---|---|---|---|---|
| | 116 | 120 | 121 | 122 | 123 |
| Layers e | | | | | 3 |
| Layers d | | | | 5 | 7 |
| Layers c | | | 8 | 11 | 13 |
| Layers b | | 24 | 20 | 20 | 17 |
| Layers a | 64 | 40 | 36 | 28 | 24 |
| Total | 64 | 64 | 64 | 64 | 64 |

Similar data may be computed for a five-layer cable with two strands in the center and a total of about forty-five strands.

For a four-layer cable the plate 123 would be omitted. With four strands in the center every sixth link would be used in layer $d$ of plate 122, resulting in the following distribution:

| | Distribution of Strands in Plates | | | |
|---|---|---|---|---|
| | 116 | 120 | 121 | 122 |
| Layers d | | | | 4 |
| Layers c | | | 6 | 9 |
| Layers b | | 20 | 16 | 16 |
| Layers a | 52 | 32 | 30 | 23 |
| Total | 52 | 52 | 52 | 52 |

Similar data may be computed for other four-layer cables and for three-layer cables. For three-layer cables plates 123 and 122 would be omitted.

It will thus be readily apparent that the invention, as embodied in the machine described in detail above, has a further advantage, namely that the change-over from one size of cable core to another may be accomplished with a minimum of effort. After the previously stranded core has been cut away and the free strand ends raveled, one or more plates at the end of the line-up may readily be pulled out over the strand ends. Excess strands may be pulled out of the remaining plates and the retained strands may be redistributed by hand without being rethreaded through these plates. For a larger cable, additional strands must be threaded through the plates and all strands must of course be threaded through any additional plate. The old strands in the old plates may also in this case be redistributed without rethreading them through the plates.

The usual compacting or polisher die 119 receives the converging strands from the plate 123 and compacts them into a cable of a desired diameter and a desired density. Said die 119 is designed to assemble the converging strands into a compact cable core or strand unit 180 which may be of circular cross-section, for example. With the proper number of strands in the successive layers for substantially filling the circular cross-section of the cable with strands, the compacting die will operate to fold the layers into complete circles, even though the layers may leave the distributing plate 123 with some gap occasioned by the mechanical construction of the plate for effecting the multilayer distribution. As the strands leave the trackway or opening 128 in the plate 123 the desired layer pattern will be fully established by the folding and compacting of the die 119.

From said die 119, the layered cable core 180 passes into the cable storing equipment C which comprises a tape wrapping attachment 181, a power-driven capstan 124, and a frictionally driven cable reel mechanism 182. The general arrangement of the cable storing equipment is similar to that disclosed in the United States Patent 1,920,182, issued to H. J. Boe on August 1, 1933. It should, however, be understood that the cable storing equipment may be of any convenient construction adapted for pulling the cable from the polisher at a uniform speed and also adapted for imparting a uniform over-all lay of a desired length to the cable.

The serving head 183 of the tape wrapping equipment is rotatably supported and carries a supply reel 184 of paper ribbon or any other suitable wrapping or binding material. Said serving head 183 is driven by a chain drive from the motor 130 at a suitable speed, applying the ribbon helically to the advancing cable.

From the serving head 183 the cable 180 passes through an aperture in the capstan supporting plate 185 and on to the capstan drum 186 which is mounted so that the receiving portion of the drum is tangentially disposed with respect to the axis of rotation of the plate 185. The capstan plate is rotatably journaled on a bearing 187 and has on its periphery gear teeth designed to mesh with a pinion 188, driven through suitable gearing from the motor 130. The capstan drum 186 is journaled in supports fastened on the plate 185 for rotation about its own axis and for rotation together with the plate 185 about the axis of the moving cable. The capstan drum 186 is driven about its own axis through the rotation of the plate 185, by bevel gears 189 through shaft 190 and a pinion 191 meshing with the stationary gear 192 fixed to the bearing 187. By this construction it will be understood that the shaft 190 is driven through the rotation of the capstan plate 185 and in turn drives the capstan drum 186 through the gears 189, 191 and 192 about its own axis.

The cable 180, after making a number of turns around the capstan drum 186, is delivered to the take-up reel 193, removably mounted in a rotatable cradle comprising a pair of spaced annular rings 194, 194, rigidly interconnected by crosspieces 195. The annular rings 194 are provided with flanged peripheral portions having gear teeth which mesh with pinions 196, 196 on the secondary shaft 197 driven by the motor 130. In this manner, rotation of said cradle and take-up reel 193 is maintained at the same speed as that of the capstan 186 and around the same axis. The take-up reel is mounted in the crosspieces 195 of the cradle for rotation about its own axis and may be driven from the capstan drive shaft 190 through friction wheels 198 and 199.

The capstan and take-up mechanism may be rotatably supported in any convenient way. For example, rollers 200, mounted in extensions of bearings 201 which support the shaft 197, may engage in grooves in annular members 202 fastened respectively to the capstan plate 185 and to the plates 194, 194 of the take-up reel cradle.

With the specific arrangement of the stranding machine, as shown in Figs. 1–12, the strands from the spools 100 are moved longitudinally with the uniform average speed through the circular distributing plate 116 and the layer distributing plates 120—123, thence through the compacting die 119 and the tape serving head 181, and pass on to the capstan 124 as a stranded cable core. The cable core takes a number of turns about the capstan in order to provide sufficient friction and is passed to the cable reel 182 for storing.

Simultaneously with this longitudinal movement of the strands and cable, there are rotary movements about the axis of the machine for securing the desired layer formation of the strands and a desired over-all stranding lay in the cable. Thus, the distributor plates 120—123 are rotated, and the conveyors 156 are driven in said plates, at a desired uniform speed, each revolution representing a cycle of layer formation; and the capstan 124 and cable reel 182 are bodily revolved approximately about the same axis as said plates to make a desired number of revolutions for producing the final over-all stranding lay.

It will be noted that the stranding lay is applied by twisting the cable bodily at a uniform speed after the layered cable has passed through the compacting die. The effect is to rotate the layer pattern about the cable axis without disturbing the established interrelation between the strands, with the result that the layered cable receives an over-all stranding lay.

The relation between the unit length of cable, in which each strand completes a cycle of position changes, and the length of lay, in which the cable is given a complete twist, depends on the requirements of the cable. Thus, in a communication cable the cycle of layer formation may be stretched over 50 to 100 feet, whereas the length of lay may be of the order of a few feet, for example, from 1 to 10 feet.

Whereas with a combination of layer distribution and over-all stranding lay, any strand may not take all possible positions within a unit length of cable relative to a surface reference line parallel with the axis, each strand will, however, take all possible positions relative to all the other strands and all strands will travel through similar paths in each unit length of cable.

Thus, in a communication cable stranded in accordance with the invention, all the strands within the cable core will be similarly exposed to the proximity of an outer metal sheath or shield and to the varying layer pressures, and all strands will necessarily be of equal length in each unit length of cable since they pass through similar paths. Thus, the inequalities in electrical characteristics of the various strands due to these varying causes may be inherently reduced to within desirable limits, and the necessity for or degree of equalization by cross-connections between cable lengths may be reduced accordingly, whether the cable be for voice or carrier frequencies or both.

It will, of course, be understood that the imparting of the stranding lay is optional and that it may be omitted if desired.

In the modified embodiment shown in Figs. 13–24, the strand spools 100 are mounted in a supporting frame 101 which may be the same as shown in Figs. 1 and 2. As in Figs. 1 and 2, the strands from the spools in Figs. 13 and 14 may pass through guides 114, 115 and through a stationary circular distributing plate 210. The plate 210 may be the same as plate 116 in Figs. 1 and 2 and it may be provided with holes for passage of the strands, or with hooks as shown in Fig. 8A. Its central portion is cut away to permit the passage of a shaft 211. At one end the shaft 211 is journaled for rotation in a bearing formed at the upper end of a pedestal 214 and it is driven by a chain and sprocket drive 212 from a motor 213. The pedestal 214 is set back far enough from plate 210 to clear the strands carried from the strand supply to plate 210.

The arrangement shown in Figs. 13 and 14 is an example of how the machine may be equipped for stranding of a five-layer cable. Thus the set of distributors 223 includes the stationary plate 210, seven chainless rotating plates 215, 216, 217, 218, 219, 220 and 221 and the rotating plate 222 which has a chain-conveyor.

The plates 215 to 221, as shown in Figs. 15 to 21, each comprises a simple flat plate having a strand guide slot therein, which is different from the strand guide opening used with a chain-conveyor, such as already described. Since the chain-conveyor runs in tracks which cause the links to follow the rim of the guide opening, the strands in the links will also follow the rim. However, in the present embodiment the strand guide opening in each plate is filled in with an inner floating portion of the plate which in general conforms to the contour of the guide opening in the outer portion but which leaves a guide slot between its rim and the rim of the main portion of the plate somewhat wider than the diameter of the strands. The strands are threaded through this slot and thus are forced to follow the desired layer configuration as they travel transversely and longitudinally through the plate.

Referring now to the drawings, Figs. 13-22, the strands from the strand supply 100 are passed through the holes, or laid into the hooks, in stationary plate 210, then threaded through the guide slots in plates 215 to 221, then laid into the hooks of the chain-conveyor in plate 222 and converged into the compacting die 119.

The stationary plate 210 is preferably provided with a double row of strand hooks as shown in Fig. 8A.

As shown in Figs. 15 to 21 the chainless plates comprise outer main plate portions 215 to 221 and inner floating plate portions 215' to 221', so shaped and dimensioned that in each case a narrow endless slot 230 to 236 is left between the outer and the floating portions. The configurations of the slots are such as will cause the traveling strands to arrange themselves in an increasing number of layers as the strands travel toward the compacting die 119.

It will be noted that the inner floating plate portions will be entirely surrounded by the body of strands passing through the machine and thus cannot be directly mechanically connected to the outer plate portions for rotation therewith.

Each of the outer plate portions 215 to 221 is mounted for rotation relative to the strand group in a corresponding one of a series of stationary circular bearing members 223 secured to a suitable pedestal 224. Anti-friction rollers 225 may be mounted in each bearing member for engagement with the rim of the associated rotatable plate, as shown in connection with the plates 215 and 216 in Fig. 13.

The outer plate portions 215 to 221 may, of course, be rotated individually, but as shown in the drawing, they are fixedly interconnected by rods 226, so that they may rotate as a unit. As shown in Fig. 13 a countershaft 239 is provided which is driven through gearing at the proper speed by motor 213. A gear wheel 241, fastened to shaft 239, meshes with an annular external gear member 242 fastened by suitable posts to the outer plate portion of distributor 215. The gearing is such that the set of outer plate portions 215 to 221 will make exactly one revolution for each revolution of shaft 211.

The inner floating plate portions 215' to 221' also are fixedly interconnected by means of rods 227, so that they too will rotate as a unit. The inner plate portion 215' is fastened at its center in any suitable manner to the end of shaft 211.

In this manner the set of inner plate portions and the set of outer plate portions may be driven in exact unison for maintaining the proper width of the strand guide slots in all the plates at any speed of operation.

It will be seen that all the strands will pass between the inner and outer cages of rods 227 and 226 without interference.

As will be noted from the examples presented above, of cables of different sizes produced by the machine shown in Figs. 1 and 2, the strand distribution in any one layer in any one plate differs for the different sizes of cable. Thus in accordance with the distribution tables the plates may carry eighty or sixty-four or fifty-two or any other number of strands. For a plate with one hundred sixty links in that machine, every other link would be used for an eighty-strand cable, whereas for a fifty-two strand cable every third link would be used, except for four instances where the strands would be four links apart. These instances would, of course, be distributed fairly evenly around the track.

In the chainless plates of the machine shown in Figs. 13 and 14, similar distributions would exist for the different sizes of cables. There is, however, no way of distributing the uneven spacing, as in the case of the fifty-two strand cable, along the guide slot. Shortly after starting the machine, the extra spaces would run together in one place along the slot in each plate.

This may not be desirable at the point of the last plate from which the strands pass into the die where they should be nearly evenly distributed. For this reason the final plate 222 with the complete five-layer distribution may preferably be made of the type using a conveyor chain.

The plate 222 may be the same as the plate 123 illustrated in Figs. 3, 4 and 12 and previously described. As shown in Fig. 22, plate 222 has an opening 237, which is the same as the opening 128 in plate 123 for forming the strands into five layers; and said opening 222, like opening 128, contains an endless conveyor chain driven by gears and sprocket wheels during rotation of said plate, in the same manner as the conveyor 156 of plate 123. Such gearing is indicated diagrammatically in Fig. 22. The plate 222 is rotated with the same speed as the other plates by a pinion 238 on the motor-driven shaft 239, said pinion meshing with a gear 240 secured to said plate. The plate 222 is rotatably mounted in a suitable stationary bearing 144, which may be of the same construction as the bearings 144 shown in Fig. 4.

It will be noted that the endless slots or tracks in the plates 216, 218 and 220, are of contours similar to the openings in the plates 120, 121 and 122 of Figs. 9-11. The strands may, if desired, pass directly from the circular distributing plate 210 to the slot or track 231 in plate 216, and thence through the slots in plates 218 and 220. However, if a more gradual progressive distribution of the strands during their passage from the circular distributing plate 210 to the compacting die 119 should be desired, there may be included the intermediate plates 215, 217, 219 and 221, interposed between the previously mentioned main plates 216, 218, 220 and 222.

With this arrangement it will be seen that in the plate 215 (Fig. 15), which receives the strands from plate 210, the single circular distribution has been altered by the track 230 to a distribution in which certain of the strands are disposed along an inwardly projecting bulge 230' of said track.

In plate 216 (Fig. 16) the strand distribution is extended by track 231 to a double layer.

In plate 217 (Fig. 17) part of the strands in the inner layer are distributed in the inwardly projecting bulge 232' of the slot or track.

The track 233 in plate 218 (Fig. 18) provides for a three layer distribution of the strands.

In plate 219 (Fig. 19), part of the strands in the third layer are extended toward the center of the plate in the inwardly projecting track bulge 234'.

The strands passing through the track 235 in plate 220 (Fig. 20) are distributed in four layers by said track.

In plate 221 (Fig. 21), part of the strands in the four-layer strands are further redistributed by the track 236, forming a new bulge 236' while in plate 222 (Fig. 22) the strands from plate 221 are arranged in five layers in the conveyor in the opening 237.

As indicated in Figs. 23 and 24, the strands 250 pass directly through the slots or tracks in the plates 215—221. The edges of said slots are preferably rounded, as indicated at 246, to eliminate undesirable friction or binding between said edges and the strands. For maintaining the strands in desired spaced relation in the tracks, which have the same total length in all the plates, there may be provided spacer discs 251, carried by the respective strands.

There may be a set of such discs for each plate. Thus the strands will be separated a distance at least equal to the radius of the discs. The discs also serve to prevent one strand from crossing another in the guide slot, since the discs tend to stay close to the back of the distributor plates due to slight friction with the traveling strands.

The discs may, of course, be made of any conventional design, whereby they may be inserted upon the strands already threaded through the machine, as for example, by making each disc in two interlocking halves, 251', 251' as shown in Fig. 24A.

In Fig. 25 there is illustrated an alternative arrangement in which the strands carry spacer members 252 which are pinned or otherwise attached to each other so that the strands are distributed around the tracks at fixed distances from each other.

During the rotation of the plates 215—221 in Figs. 13 and 14, the strands passing through the slots 230—236 tend to remain stationary in the rotary sense. However, the inwardly projecting or eccentric surfaces of said slots engage the successive strands in each revolution of said plates and exert a camming action upon them to impart transverse movements to said strands for arranging them in the appropriate layer distribution. For instance, assuming the plate 216 to be rotating in the direction of the arrow in Fig. 16, the strand 250 shown in the lower part of the track 231, while tending to remain stationary, will be engaged by the track surface 231' and cammed radially inwardly into the inner track portion. Successive strands will be likewise cammed by said surface 231' into said inner track portion, pushing the strands ahead of them around said inner track portion. Upon the completion of one revolution of the plate 216, each of the strands passing therethrough has traveled around the entire two-layer track 231 in said plate. The camming action of the track portion 231' upon each strand is assisted by the fact that each strand is backed by the other strands behind it in the outer track, with resultant resistance to travel in the direction of rotation of the plate as the surface 231' engages the strand. In each revolution of said plate 216, each strand while traveling longitudinally therethrough under the action of the capstan 124, is moved transversely of said longitudinal movement, around the two-layer track 231.

In further explaining this interaction between strands and track it will be assumed for a moment that there is no longitudinal movement of the strands.

As the camming portion 231' moves against the strands in both layers there will be a certain packing of the strands in both layers at this point, and as the camming portion 231'' moves away from the strands in both layers there will be a certain easing up between the strands at this point. Since the linear movement of the outer track is faster than that of the inner track the packing in the outer track near the portion 231' would be greater than in the inner track.

However, with a longitudinal movement of the strands several times faster than the linear rotary movements at any part of the track it is readily understood that an almost liquid condition of motion is obtaining for the strands at any point of the track.

Thus the greater packing pressure in the outer layer is able to overcome the smaller pressure in the inner layer to force strands from the outer laye raround the bend at portion 231' into the inner layer. Similarly the unbalanced condition at the bend 231'' will tend to admit strands from the inner layer to the outer layer.

A strand in the outer layer of course remains stationary in space until it reaches the bend 231' where it will move radially into the inner layer. Since in this manner strands will be continuously and slowly fed into the inner layer, this entire layer will travel in the track in the direction of rotation; it is obvious that the strands will travel faster than the camming portion 231' which continuously feeds them into the inner layer.

Thus in spite of the tendency of the strands to remain stationary they will be temporarily removed from the outer layer and displaced along the inner track at a greater speed than that of the inner track. The time spent in the inner track is equal to the time of travel of a point 250' to the point 250 along the circle of the outer track so that a strand may complete its travel in the whole track in one revolution of the plate.

The displacement of strands through the inner track by strands in the outer track thus is due to the greater total longitudinal tension in the greater number (50) of strands overcoming the smaller total tension in the fewer (30) strands, and also due to the difference in linear speed of the two track portions.

Similarly, the strands in the other plates 215, and 217—221, are moved transversely of their longitudinal travel, under the action of the camming surfaces in the plate trackways, so that, in each revolution of said plates each strand in any plate passes around the track in said plate.

The strands passing from the plate 221 through the conveyor in the opening 237 in the plate 222 are moved by said conveyor around the five layers provided by said opening, in each revolution of said plate, in the same manner as previously described with respect to the plate 123 in Figs. 1-12.

From the plate 222 the strands pass through the compacting die 119. From said die the stranded cable passes a tape wrapping attachment 181, over the power-driven capstan 124 and onto the cable reel mechanism 182. These elements may be the same as above described in connection with Figs. 1 and 2.

In summing up the operation of the embodiment illustrated in Figs. 13-24, the distributor plates 215—221, together with the distributor plate 222, are rotated in unison while the cable strands are drawn through said plates by the capstan 124. As said strands pass through the slots or tracks in the respective plates 215—221, they are forced around the respective tracks 230—236, thus moving transversely of the distributor plates so that each strand travels through the successive strand layers in each of said plates. Finally the strands emerging from the plate 221, arranged in the layer distribution provided by that plate, are formed into five layers during their passage through the conveyor traveling in the opening 237 of the plate 222, during one revolution of the latter. In other words, as in the embodiment shown in Figs. 1-12, the strands in Figs. 13-24 embodiment are progressively formed into the desired five-layer distribution during their travel through the rotating distributor plates, and each strand is caused to pass through all positions in succession in each layer of the strand distributions. At the end of each revolution of each plate, the strands passing therethrough are restored to the same relative positions that they occupied at the beginning of the revolution, while the body of strands generally remains stationary. Thus each strand, during the travel of a predetermined length of cable through the machine, passes through all of the positions simultaneously occupied by all of the strands in the finished cable, so that in each predetermined length of finished cable each strand occupies successive positions at all possible depths from the surface to the center.

It will, of course, be understood that the spacing of the distributor plates is diagrammatic and may be varied as desired.

In connection with the rotatable distributor plates 120—123 of Figs. 1-12, as well as the distributor plates 216—222 of Figs. 13-22, it may be noted that the points of folding in of the successive layers in each plate are preferably positioned along a diameter of that plate, thus enabling a symmetrical layer pattern to be readily obtained.

In Fig. 26 there is shown diagrammatically a stationary circular distributing plate such as the plate 116 in Fig. 1, and three rotary distributing plates for producing a reentrant type cable of four layers. These distributor plates may, for example, be the plates 216, 218, and 220 in Figs. 13-21, or they may be the plates 120, 121 and 122 of Figs. 9, 10 and 11.

In Fig. 27 there are shown diagrammatically a circular distributing plate 116 and four rotary distributing plates such as 216, 218, 220 and 222, or 120—123 for producing a five-layer reentrant type cable, one plate having been added to the set-up in Fig. 26 for stranding an additional layer. In this figure, as in Fig. 26, details and intervening parts have been omitted for the sake of clarity.

It should be borne in mind that the camming action of the strand guide tracks or slots in the rotating distributor plates, in either of the two specific embodiments, described above, must be prevented from imparting too much of a twist to the body of strands passing through the machine in order to avoid added interference between the strands in a given set-up.

This may be accomplished simply by establishing two conditions, namely, first, as little friction as possible in each plate between the track and the conveying means for the strands or between the guide slot and the strands, as the case may be, and second, sufficient longitudinal tension in the strands. Thus, due to sufficient longitudinal tension the body of strands will tend to retain its general position in space, and due to low friction the individual strands will move laterally in the distributor plate with little restraint.

Thus, if a common conveying means for the strands in each plate could be made sufficiently frictionless it would not be necessary to provide a planetary or similar drive therefor, as described above for the first embodiment, since the tensioned strands would hold the conveyor against the movements of the track. This condition is of course taken full advantage of in the second embodiment. The friction may be reduced by proper conditioning of the engaging surfaces but may of course be further reduced by increasing the distances between the distributor plates and also by the addition of intermediate distributor plates so that the bends in the strands at any plate will be reduced to a reasonably small angle.

It will be possible however under such circumstances, to ease the strain on the strands somewhat by permitting a gradually increasing fixed twist of the body of strands as it passes through the distributor plates, without in any way affecting the layer formation in the cable.

Thus if one complete fixed twist of the body of strands may be tolerated, without objectionable interference between the strands, as they pass from the stationary distributor to the compacting die, the last plate should retain its position as illustrated in the drawings for both embodiments, but all the other plates should be shifted proportionate angles in the direction of rotation of the plates, before any strands are threaded through the machine. Thus, during operation a strand in position 0, with respect to all tracks would follow a fixed single spiral line between the stationary plate and the final plate and the body of strands would be permitted an over-all angular displacement due to friction with each plate that would add up to a complete twist in the direction of the rotation.

This may be explained as follows for a machine with eight rotary distributor plates, as shown in Figs. 12 and 13: a strand from the stationary plate enters the successive rotary plates, where it may be permitted a forward fixed displacement in each plate of one-eighth of a revolution due to friction with the guide slot. Each plate therefore must be shifted one-eighth of a revolution forward relative to the preceding plate so that the strand at a given moment still will pass through position 0 simultaneously in all the plates. The eighth or last plate completes the twist.

The tension required to hold a strand along a spiral line is considerably less than that required to hold it perfectly taut in a line parallel with the axis of the machine. It will thus be necessary to adjust the longitudinal tension at the spools to the value that will cause the body of strands to twist on an average through one-eighth revolution in each plate, where such twist is desired.

Thus, a certain amount of fixed twist may be desirable to reduce the tension required to force the strands through all the configurations of the various tracks or slots. But the twist is limited by the possibility of interference between the strands which will increase with the twist for a given number of plates, but may be reduced by increasing the number of intermediate plates for a given number of layers in the cable.

These considerations of course do not require attention where the strand conveyor is mechanically driven as in the first embodiment described above.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

Thus it should be understood that the terms layer distribution and multilayer distribution, as used in this specification and in the claims, are not necessarily intended to be confined to those of circular patterns, but are intended to include within their meaning distributions with non-concentric curves, for example, such as are shown in the intermediate plates in Figs. 15, 17, 19 and 21, and to also include distributions in zig-zag layers, such as indicated in Fig. 28, which may be used throughout the machine for stranding of substantially rectangularly-shaped cables or may be used for intermediate stranding stages leading up to a final distribution plate with the concentric circular distribution.

What is claimed is:

1. A method of stranding a cable having a plurality of strands arranged in a plurality of layers including the steps of feeding all of said strands simultaneously and in a given order from a strand supply through a series of multilayer distributions of increasing pluralities of layers into the desired plurality of layers.

2. A method of stranding a cable having a plurality of strands arranged in a plurality of layers which comprises feeding said strands simultaneously and in a given order from a strand supply through a series of multilayer distributions of increasing pluralities of layers to the desired plurality of layers, moving said strands transversely in said order to each occupy substantially all positions in the said desired plurality of layers, and then feeding the strands with the desired plurality of layers into a compacted cable.

3. A method of stranding a cable having a plurality of strands arranged in a plurality of layers which comprises feeding said strands simultaneously and in a given order from a strand supply through a series of multilayer distributions of increasing pluralities of layers to the desired plurality of layers, moving said strands in passing through said distributions transversely in said order to each occupy substantially all positions in succession in each layer of each of said distributions, and then feeding the strands with the desired plurality of layers into a compacted cable.

4. A method of stranding a cable having a plurality of strands arranged in a plurality of concentric layers which comprises feeding the strands from a single layer formation into a multilayer cable and moving the cable lengthwise at a substantially uniform speed, guiding the strands lengthwise through a succession of distributing points between the single layer formation and the formed cable to form a double layer formation at a first point and to then form one additional layer at each of a plurality of subsequent points until the desired layer formation has been reached, then compacting the strands with the desired layer formation into the cable and at each of said points guiding the strands laterally in their original order of succession to move each passing strand through all positions in each layer formed at the point, the lateral movements of the strands at all the points being in unison.

5. A method of reentrant stranding of a cable having a plurality of strands arranged in a plurality of layers which comprises feeding all of the strands simultaneously from a strand supply through a series of multilayer distributions of increasing pluralities of layers and in each multilayer distribution moving the strands transversely in a given order along each layer and adding an inner layer to the layer distribution in a preceding distribution.

6. A method of stranding a reentrant type cable having a plurality of strands arranged in a plurality of layers which comprises feeding all of the strands simultaneously and in a given order from a strand supply longitudinally and transversely through a series of multilayer distributions of increasing pluralities of layers to the desired plurality of layers and in each succeeding multilayer distribution deforming the innermost layer of the preceding distribution inwardly for the formation of a new innermost layer and redistributing the strands in accordance with the increased number of layers.

7. A method of stranding a reentrant type cable which comprises pulling a group of separate strands lengthwise through a series of different redistribution planes, shifting said strands in a fixed order transversely through all distribution points in the different planes, the strands at a first said plane being distributed in two substantially concentric layers, the strands from the inner layer in said first plane being redistributed in a second said plane into an additional layer inside said already formed inner layer, the strands at subsequent planes being similarly redistributed into additional layers innermost of the previously formed layers until the desired plurality of layers have been formed and then compacting the strands into the cable with the desired layer formation.

8. In a cable stranding machine for reentrant stranding, a first strand distributor for guiding each of the passing strands in a fixed order laterally through all positions in a plurality of layers and a second strand distributor for subsequently guiding each of the passing strands in said fixed order laterally through all positions in a greater plurality of layers than in said first strand distributor.

9. In a cable stranding machine for reentrant stranding, a first strand distributor for guiding each of the passing strands in a fixed order laterally through all positions in a plurality of layers and a second strand distributor for guiding each of the passing strands from said first distributor in said fixed order laterally through all positions in one more than said plurality of layers.

10. In a cable stranding machine for reentrant stranding, a plurality of multilayer distributors for guiding the strands from a strand supply to a cable compacting device and having tracks configurated in successive different layer patterns to guide all the strands laterally in a fixed order through all positions in each layer of successive layer formations, said guide tracks having a progressively increasing number of layers in successive distributions.

11. A machine for reentrant stranding of a multiconductor cable comprising a plurality of distributor plates, and means for pulling a plurality of conductor strands arranged in a fixed order successively through said plates, each plate having a slot-like guide opening configurated for lateral displacement of the individual strands through all positions in the configuration and in the fixed order of strands during each cycle of operation of the machine, the openings in successive plates being configurated in increasingly complex patterns until the last plate in which the opening has a pattern equivalent to that in the cable, tensioning means for holding the individual strands against the frictional action of the guide openings to maintain a fixed over-all formation of the body of strands while the individual strands are being displaced, and power driven means for maintaining continuous cyclical movements between said guide openings and said body formation.

12. A cable stranding machine for reentrant stranding, comprising strand supply spools, multilayer strand distributing means and a cable compacting die, said distributing means including a succession of strand guide plates each having guide surfaces patterned to distribute all the strands of the cable in a fixed order into a plurality of concentric layers, the plurality of layers being increased by one by the surface of each plate over the plurality in the preceding plate until the desired plurality of layers for the cable is reached and being increased by a new innermost layer formed by folding of the innermost layer from the preceding plate within itself.

13. A cable stranding machine in accordance with claim 12 in which the points of folding in of the different layers are located along a diameter to establish a substantially symmetrical layer pattern.

14. A multilayer stranding machine for a reentrant type cable comprising a stationary spool mounting including a plurality of individually rotatable strand spools, a cable compacting die for gathering the strands from said spools into a cable and a plurality of rotating strand distributing means intermediate said mounting and said die having camming means adapted to act upon said strands for periodically moving each strand transversely and radially for successive guidance of the strands from a single layer distribution, through an intermediate different distribution into the final layer distribution of the multilayer cable as the strands pass through said successive distributing means.

15. A cable stranding machine comprising a stationary spool mounting including individual strand spools, a cable compacting die for gathering the strands from said spools into a cable, means for drawing the strands from said spools through said die, stationary means between said spools and said die for distributing the strands from said spools in a single layer, and rotary means between said stationary means and said die for distributing said strands into a plurality of layers, said rotary means comprising a plurality of rotatable elements for progressively distributing said strands in increasing numbers of layers during the travel of the strands through said elements.

16. A cable stranding machine comprising a strand supply including a plurality of individual strand spools, a circular distributor with guiding means for all the strands of the cable from said spools, a plurality of multilayer track plates for stagewise guiding of all the strands into a final concentric multilayer formation having movable guiding means for all the strands and having differently configurative tracks for said guiding means, a cable compacting die for gathering the strands with their final layer formation into a cable of substantially circular cross-section, means for pulling the strands at uniform speed through said machine, and driving means for rotating said track plates in unison for moving the guiding means along said differently configurated tracks transversely of the axis of the machine for progressively guiding the strands from the circular distributor through a series of stages of an increasing number of layers in said multilayer distributors to the said final concentric multilayer formation.

17. A cable stranding machine comprising a stationary strand supply including a plurality of individual strand spools, cable compacting means for gathering all the strands from said supply into a cable of substantially circular cross-section, power driven means for pulling all the strands at a uniform average speed lengthwise through said machine, a single layer distributing plate having guiding means for all the strands, a plurality of rotating multilayer distributing plates arranged in succession between said single layer plate and said compacting means, each of said multilayer plates having strand guiding means for all the strands, and driving means for rotating said multilayer plates in unison relative to their said guiding means, said multilayer plates having tracks differently configurated to define fixed paths in the different plates for imparting translatory movements to said guiding means and to all the strands in a predetermined order for gradual distribution of all the strands from a single layer distribution into a desired layer distribution having a plurality of concentric layers, and said desired layer distribution being continuously fixed by said compacting means for inclusion in the cable.

18. A cable stranding machine for reentrant stranding comprising a plurality of stationary strand spools, cable compacting means, multilayer strand distributing means between said spools and compacting means including a first strand guiding plate having guide surfaces patterned to distribute all of the strands from said spools in a fixed order in a plurality of concentric layers and a second strand guiding plate having guide surfaces patterned to redistribute all the strands from said first plate in said order in a greater plurality of concentric layers, common driving means for rotating said plates in unison relatively to the passing body of strands for guiding said strands in said order along said surfaces to guide each strand into all the said layers in each plate during each revolution, and pulling means for pulling the body of strands from said spools through said distributing means and through said compacting means.

19. A cable stranding machine in accordance with claim 18 further comprising an endless flexible spacing element adjacent one of said guide surfaces and adapted to hold each passing strand apart from the adjacent strands during the entire revolution of said surface.

20. A cable stranding machine in accordance with claim 18 further comprising a riding washer about each of said strands adjacent to one of said plates for holding the strands at a fixed spacing and maintaining the strands in said fixed order during the entire revolution of said plate.

21. A cable stranding machine in accordance with claim 18 further comprising an endless flexible spacing element disposed along said guide surface in each of said guide plates and adapted to guide the passing strands with a desired spacing along the entire said patterned surface, and individual driving means for said spacing element in each of said guide plates for mparting lengthwise movement to said spacing element along said surface during rotation of the plate.

22. A cable stranding machine for reentrant stranding comprising a plurality of stationary strand spools, multilayer strand distributing means including a first strand guiding plate having guide surfaces patterned to distribute all the strands from said spools in a fixed order into a plurality of concentric layers including an innermost layer and a second strand guiding plate having guide surfaces patterned to redistribute all the strands from said first plate in said order into a plurality of concentric layers similar to that of said plate and including an additional layer formed between said plates by the folding of said innermost layer into a layer within itself, said machine further comprising common driving means for rotating said plates in unison relative to the passing body of strands for guiding said strands in said order laterally along said surfaces to guide each strand along all the said layers in each plate during each revolution, and pulling means for pulling the body of strands from said spools through said distributing means.

23. A cable stranding machine for gradually stranding a body of strands through successive stages of increasingly complex layer formations into a desired layer formation, said machine including a strand distributing plate at one of said stages having guide track means configurated in accordance with its assigned layer pattern for imparting lateral movement to all the strands in predetermined order along said track, and means for rotating said track means relative to said body of strands.

24. A cable stranding machine comprising a strand supply including a plurality of individual strand spools, a plurality of multilayer distributors for stagewise guiding of all the strands into a desired multilayer formation from said spools, a cable compacting die for gathering the strands with the desired layer formation into a cable and means for pulling the strands at a uniform average speed through said machine, each of said multilayer distributors having a guide track patterned for laterally guiding all the strands in a predetermined order of succession through the pattern of its assigned stage of layer formation and including driving means for effecting lateral movement of the strands relative to said guide track.

25. A cable stranding machine comprising a strand supply including a plurality of individual strand spools, a circular distributor for all the strands from said spools, a plurality of strand distributors for stagewise guiding of all the strands from the circular distribution into a desired multilayer formation, a cable compacting die for gathering the strands with the desired layer formation into a cable and means for pulling the strands longitudinally through said machine, each of said distributors having strand guiding means for guiding the strands in a predetermined order through said distributor, and each of said multilayer distributors having camming means for moving its associated guiding means transversely of the axis of the machine from one layer to another in said order.

26. In a cable stranding machine a strand supply including a plurality of individual strand spools, a circular distributing plate having guiding means for all the strands in the cable from said spools, a plurality of multilayer distributing plates for guiding all the strands stagewise into a desired layer formation, each having a track configurated to represent its assigned stage of a progressive series of stages of the layer formation and each having traveling guiding means along said track for all the strands, a cable compacting die for gathering the strands with the desired layer formation into a cable, a drum for pulling the strands at a uniform speed through said machine, and power driven means for establishing relative movement between said tracks and their associated guiding means, said relative movement being in unison for all said multilayer distributing plates, and each of said tracks being adapted to guide the relative travel of its associated guiding means together with the longitudinally passing portions of the strands through a cyclic path of substantially concentric layers as defined by its configuration.

27. A cable stranding machine comprising a strand supply including a plurality of individual strand spools, a circular distributing plate for guiding all the strands of the cable from said spools in a single layer formation, a plurality of multilayer distributing plates for guiding all the strands stagewise into a desired multilayer formation from said single layer formation, a cable compacting die for gathering the strands with the desired layer formation into a cable and power means for pulling the strands at a substantially uniform speed through said machine, each of said multilayer distributing plates having a guide track configurated to represent an assigned stage of a progressive series of stages of increasing numbers of layers, each of said tracks being adapted to guide the passing portions of all the strands in a predetermined order through a cyclic path of substantially concentric portions as defined by its configuration, said machine further comprising driving means for effecting relative movement between said tracks and strand portions laterally of said strands.

28. A cable stranding machine for stranding a body of individual strands into a cable with a desired complex layer distribution in which each strand occupies all positions in each layer within a given length of cable, said machine comprising a spool supply of strands including tensioning means for the strands and means for guiding the strands in a given order into the machine, compacting means for packing the body of strands into a cable with the desired layer formation, a plurality of distributor plates having guide track means in each plate of different configurations in the different plates for continuously varying the distribution of said strands from an initial simple configuration and through successive configurations of increasing complexity into the desired layer distribution, means for pulling said body of strands continuously and longitudinally through all of said track means in succession against the tension applied by said tensioning means and in said given order while the body maintains a resultant fixed angular relation to said spool supply between said spool supply and compacting means, and means for continuously rotating relative to said spool supply said guide track means in each plate with its individual configuration for the cyclical and lateral displacement of the individual strands in said given order through the entire distribution configuration in the plate during the longitudinal movement of the strands and for restoring each strand at the completion of each revolution of the plate to the same relation with respect to all other strands as at the beginning of the revolution.

29. A machine for reentrant stranding of a cable comprising a plurality of strand supply spools including strand tensioning means and strand feeding means, compacting means for packing the strands into a cable with a desired layer formation, a plurality of rotating distributor plates for continuous varying of the distribution of the strands through increasingly complex configurations in successive plates into the desired layer formation for the cable, each plate having guide track means individually configurated for lateral displacement of the individual strands through the entire assigned configuration stage of layer distribution during each revolution of the plate and means for pulling the strands in a given order successively through all of said guide track means against the tension applied by said tensioning means, said tensioning means being adapted to maintain said body of strands in a substantially fixed resultant angular position in each plate relative to said spool supply against the frictional action by said track means.

30. In a cable stranding machine for reentrant stranding, a plurality of stationary strand spools, a plurality of rotating multilayer distributors having guide tracks configurated to guide all the strands in a fixed order laterally through all positions in each layer of successive layer formations having a progressively increasing number of layers in successive distributors, compacting means for transfixing the strands in the layer formation having the largest number of layers, and means for rotating said distributors in unison relative to the longitudinally passing strands.

31. A cable stranding machine comprising a spool supply, including stationary individually pivoted strand spools, a cable compacting die for gathering the strands from said spools into a cable, means for drawing the strands from said spools through said die, stationary means between said spools and said die for distributing the strands from said spools in a single layer, and rotary means between said stationary means and said die for distributing said strands into a plurality of layers.

32. A cable stranding machine comprising a stationary spool mounting, a cable compacting die for gathering the strands from said spools into a cable, means for drawing the strands from said spools through said die, and means interposed between said spools and said die for distributing said strands in a plurality of layers during their travel towards said die, said distributing means being mounted for rotation about an axis and means comprising endless multilayer tracks in said distributing means for imparting movement to said strands relative to said distributing means and transversely of said axis during rotation of said distributing means for reentrant stranding of a cable.

33. A cable stranding machine comprising a stationary spool mounting, a cable compacting die for gathering the strands from said spools into a cable, means for drawing the strands from said spools through said die, and means interposed between said spools and said die for distributing said strands in a plurality of layers during their travel towards said die, said distributing means being mounted for rotation about an axis, endless multilayer track means in said distributing means, means for maintaining the strands in said track means in spaced relation to each other, said track means having camming surfaces therein adapted for direct engagement with the strands for moving said strands transversely of said axis from one layer to another during rotation of said distributing means.

34. A cable stranding machine comprising a stationary spool mounting, a cable compacting die for gathering the strands from said spools into a cable, means for drawing the strands from said spools through said die, and means interposed between said spools and said die for distributing said strands in a plurality of layers during their travel towards said die, said distributing means being mounted and power driven for rotation about an axis, endless multilayer track means in said distributing means, conveyer means in said track means, said conveyer means having means for receiving said strands and maintaining them in spaced relation with respect to each other in said track means, and means for moving said conveyer means along said track means transversely with respect to said axis during rotation of said distributor means for reentrant stranding.

35. A cable stranding machine comprising a stationary spool mounting, a cable compacting die for gathering the strands from said spools into a cable, means for drawing the strands from said spools through said die, and means interposed between said spools and said die for distributing said strands in a plurality of layers during their travel towards said die, said distributing means being mounted for rotation about an axis, endless multilayer track means in said distributing means, conveyer means in said track means, said conveyer means having means for receiving said strands and maintaining them in spaced relation with respect to each other in said track means, and planetary means operable by rotation of said distributing means for moving said conveyer means along said track means.

36. A cable stranding machine comprising a stationary spool mounting, a cable compacting die for gathering the strands from said spools into a cable, means for drawing the strands from said spools through said die, and means interposed between said spools and said die for distributing said strands in a plurality of layers during their travel towards said die, said distributing means being mounted for rotation about an axis, endless multilayer track means in said distributing means, conveyer means in said track means, said conveyer means having means for receiving said strands and maintaining them in spaced relation with respect to each other in said track means, stationary gear means adjacent said distributor means, and planetary gearing carried by said distributor means and cooperating with said stationary gear means for imparting movement to said conveyer means along said track means during rotation of said distributor means.

37. A stranding machine for making a multilayer reentrant type cable, said machine comprising a stationary strand supply including a plurality of individually rotatable strand spools and a stationary mounting for said spools, a cable compacting die for gathering the strands from said spools into a multilayer cable, and strand distributing means intermediate said mounting and said die including a rotating guide member having a track configurated to represent the layers in said cable and conveyer means adapted for relative travel along said track, said conveyer means including strand guides adapted for moving each of the strands with said conveyer means transversely and radially into all the different layers of said cable in conformity with said track configuration, as the strands pass through said machine.

38. A cable stranding machine comprising a stationary spool mounting, a cable compacting die for gathering the strands from said spools into a cable, means for drawing the strands from said spools through said die, means interposed between said spools and said die for distributing said strands in a plurality of layers during their travel towards said die, said distributing means being mounted for rotation about an axis, and strand retaining means for effecting movement of said strands relative to said distributing means and transversely of said axis during rotation of said distributing means.

39. A cable stranding machine comprising a stationary strand supply including strand spools, a motor driven cable drum for pulling the strands lengthwise at uniform speed and a layer distributor disposed between said strand spools and said drum for guiding all the strands lengthwise into a desired multilayer formation and including a revolving track configurated in accordance with said layer formation, guide means in said track for all the strands and means for causing said guide means to move along said revolving track to periodically move each of the strands transversely along the different layers of said formation by the action of said revolving track.

40. In a cable stranding machine for reentrant stranding, a plurality of stationary strand spools and a multilayer distributor having rotating guide track means patterned to guide the strands from said spools in a fixed order laterally through all positions in a plurality of substantially concentric layers of the track pattern without imposing a permanent twist to the group of strands relative to said strand spools.

41. In a cable stranding machine, a multilayer distributing plate for guiding a plurality of strands with a concentric layer formation into a cable of substantially circular cross-section comprising a double track configurated to represent effectively the said layer formation, an endless flexible conveyer disposed against said track for continuous travel relative to and along both sides of said track, a plurality of individual guide means for all the strands of the cable substantially uniformly distributed along and connected with said conveyer for the movement of each of said strands transversely of its lengthwise direction into all positions in said layer formation, driving means for revolving said plate about the axis of the machine relative to said conveyer, and retaining means acting upon said conveyer to restore at the end of each revolution of said plate adjacent strands to their relation at the beginning of the revolution by untwisting temporary twists of adjacent strands due to said movement.

42. In a stranding machine, a strand distributing conveyer chain having a plurality of links for lateral movement of a plurality of passing strands, each of said links having two parallel link members, one of said link members having a projecting hook opening in the direction of travel of said link and the other said link member having a projecting hook opening against the direction of travel, said hooks being placed side by side in spaced relation to permit a strand to be laid down between them and to pass under both said hooks for locking and to be straightened out substantially without kinks when put under tension for longitudinal movement through said hooks.

43. A stranding machine comprising a strand spool supply, an annular plate for receiving strands from the supply spools and distributing said strands in a circular layer, said plate having a series of hooks facing in one direction, and also having another series of hooks facing in the opposite direction and positioned adjacent the respective hooks of the first series to enable strands to be laid between and under oppositely facing hooks of the respective series, and means for receiving the strands from said hooks and distributing said strands into a plurality of layers.

OSVALD E. RASMUSSEN.

No references cited.